(12) United States Patent
Sauerbrei

(10) Patent No.: US 7,233,341 B1
(45) Date of Patent: *Jun. 19, 2007

(54) SPACING OBJECTS WITHIN A CONSTRAINT

(75) Inventor: Peter Sauerbrei, Foster City, CA (US)

(73) Assignee: Autodesk, Inc., San Rafael, CA (US)

( * ) Notice: Subject to any disclaimer, the term of this patent is extended or adjusted under 35 U.S.C. 154(b) by 376 days.

This patent is subject to a terminal disclaimer.

(21) Appl. No.: 09/955,434

(22) Filed: Sep. 10, 2001

Related U.S. Application Data

(63) Continuation of application No. 09/240,070, filed on Jan. 29, 1999, now Pat. No. 6,323,879.

(60) Provisional application No. 60/085,436, filed on May 14, 1998.

(51) Int. Cl.
*G06T 3/20* (2006.01)

(52) U.S. Cl. .................. 345/672; 345/629

(58) Field of Classification Search ........ 345/581, 345/441, 442, 443, 619, 629, 672, 678–680
See application file for complete search history.

(56) References Cited

U.S. PATENT DOCUMENTS

| | | | |
|---|---|---|---|
| 4,675,830 A * | 6/1987 | Hawkins ............... 345/666 |
| 5,301,284 A | 4/1994 | Estes et al. ............ 395/400 |
| 5,509,113 A * | 4/1996 | Takakura et al. ........ 345/442 |
| 5,555,357 A * | 9/1996 | Fernandes et al. ...... 345/441 |
| 5,590,247 A | 12/1996 | Mikuni .................. 395/110 |
| 5,611,036 A * | 3/1997 | Berend et al. .......... 345/441 |
| 5,623,593 A | 4/1997 | Spells, III ............. 395/172 |
| 5,634,133 A * | 5/1997 | Kelley ................... 715/503 |
| 5,704,028 A * | 12/1997 | Schanel et al. ......... 345/440 |
| 5,796,401 A | 8/1998 | Winer .................... 345/433 |
| 5,803,629 A | 9/1998 | Neville et al. .......... 400/304 |
| 5,831,632 A * | 11/1998 | Schuster et al. ........ 345/441 |
| 5,838,328 A * | 11/1998 | Roller ................... 345/420 |
| 5,883,625 A * | 3/1999 | Crawford et al. ....... 345/788 |
| 5,926,186 A * | 7/1999 | Itoh et al. .............. 345/619 |
| 5,982,383 A * | 11/1999 | Kumar et al. ........... 345/440 |
| 6,065,021 A * | 5/2000 | George ................... 715/502 |
| 6,310,622 B1 * | 10/2001 | Asente ................... 345/441 |
| 6,323,859 B1 * | 11/2001 | Gantt .................... 345/419 |

* cited by examiner

*Primary Examiner*—Jeffery A. Brier
(74) *Attorney, Agent, or Firm*—Patterson & Sheridan, L.L.P.

(57) ABSTRACT

A system and method are described for spacing objects within a constraint. In one embodiment, data that defines the constraint and a set of spacing parameters that indicate how to space objects across the constraint are received. Further, a grid type from a plurality of grid types is selected. Each such grid type is associated with one or more grid attributes. A grid of the selected grid type is then mapped onto the constraint.

52 Claims, 15 Drawing Sheets

SPACING OBJECTS WITHIN A CONSTRAINT

This patent application is a continuation of U.S. patent application Ser. No. 09/240,070, filed on Jan. 29, 1999, now U.S. Pat. No. 6,323,879 entitled METHOD AND SYSTEM FOR DETERMINING THE SPACING OF OBJECTS, which claims priority from U.S. Provisional Patent Application No. 60/085,436, filed on May 14, 1998, entitled METHOD AND SYSTEM FOR MANIPULATING DIGITAL VISUAL INFORMATION, the content of which is hereby incorporated by reference for all purposes in their entirety.

FIELD OF THE INVENTION

The present invention relates to computer software and, more specifically, to a method for determining the spacing of objects.

BACKGROUND OF THE INVENTION

The spacing of objects has been a fundamental problem through history. Architecture design programs, generally known as computer aided design (CAD) programs, provide a planning mechanism that allows individuals to simulate the architecture and physical layout of a particular design. By simulating the layout of a particular design, a significant reduction in manufacturing costs may be realized as mistakes are identified and corrected and design changes are made prior to construction or manufacturing of the particular design.

In certain cases, a design may require a particular type of object to be placed at multiple locations within a particular area (the "target area"). For example, a building design may require that windows be placed fifteen feet apart on each floor of the building.

To determine the spacing of objects, typical design programs query the user to enter a "requested object count" and a "requested spacing offset". The requested object count indicates a number of objects that the user wishes to place in the target area. The requested spacing offset indicates a particular spacing that the user wishes to achieve between each object. The user may also specify a start location and a particular direction for the spacing objects.

To map the object into the target area, the design program identifies and places an object at the starting location, typically referenced as location (0,0) relative to the target area. The design program then identifies a next location based on the requested spacing offset and places an object at the next identified location. This process is repeated until the "requested" number of objects have been mapped.

A drawback associated with spacing objects in this manner is that the requested object count and requested spacing offset may not correctly conform to the boundaries of the target area. For example, if the "requesting" spacing of windows or the "requested" window count is too high, some windows may be placed beyond the end of the wall in which they are to be built. Thus, the user is required to repeatedly modify the requested object count and spacing offset values on a trial and error basis to achieve a desired spacing of objects for the particular area.

For example, FIG. 1A illustrates the mapping of objects as performed by the prior art. As depicted, FIG. 1A includes areas 102 and 104 in which a set of window objects 106 and 108 are respectively mapped. For area 102, the user specified a requested object count equal to "4" and a requested spacing offset equal to "10". Because the requested object count and requested spacing offset do not correctly conform to the area 102, the placement of window object 106 does not correctly conform to area 102. Conversely, for area 104, the user specified a requested object count equal to "5" and a requested spacing offset equal to "10". Here again, because the requested object count and requested spacing offset do not correctly conform to the area 104, the placement of window object 108 does not correctly conform to area 102. Thus, to cause the window objects 106 and 108 to correctly conform with areas 102 and 104, the user must modify either or both of the requested object count or requested spacing offset values and again wait for the design program to map the objects into the corresponding areas to determine whether the requested object count and requested spacing offset correctly conform to the corresponding areas.

Another drawback with the prior art is that the spacing of objects can only be performed in a single direction. Therefore, a user cannot easily perform the spacing of objects in a multi-dimensional area. For example, FIG. 1B depicts a side of a building 120 for which a user requires window objects 122 to be spaced on multiple floors 124, 126, 128 and 130. To cause the spacing of widow object 122 to conform to floor 130, the user repeatedly interacts with a design program to enter the appropriate requested object count and requested spacing offset values for floor 130. Likewise, to cause the spacing of widow object 122 to conform to floor 128, the user repeatedly interacts with the design program to enter the appropriate requested object count and requested spacing offset values for floor 128. However, because a user can only define the spacing of objects in a single direction, the user cannot easily control the spacing of window object 122 between floors 128 and 130.

Based on the foregoing, it is highly desirable to provide a mechanism that can be used for the spacing of objects without having to repeatedly map the objects on a trial and error basis to obtain a desired spacing.

It is also highly desirable to provide a mechanism that performs spacing of objects for multi-dimensional areas.

SUMMARY OF THE INVENTION

A method and system for determining the spacing of objects is described.

According to the method, input is received that indicates bounds of at least one dimension of a constraint. A set of supplied parameter values associated with a particular type of grid is also received. A set of generated parameter values for the particular type of grid is then generated based on the set of supplied parameter values and the input indicating bounds of at least one dimension of a constraint. A set of points for spacing objects is generated based on the set of supplied parameter values and said set of generated parameter values.

According to one aspect, a set of object information is received that identifies a particular object to be placed on the constraint at locations that are based on the set of points.

According to another aspect, the set of object information identifies a bounding box that is associated with the particular object. The bounding box is then used to generate the set of generated parameters.

According to another aspect, a set of object locations is determined by mapping the set of points to the constraint. In certain aspects, pivot point information is received that specifies the placement of objects relative to the generated set of points. Objects are placed on the target constraint such that the pivot points of the objects coincide with the object locations.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for determining the spacing of objects is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1A:
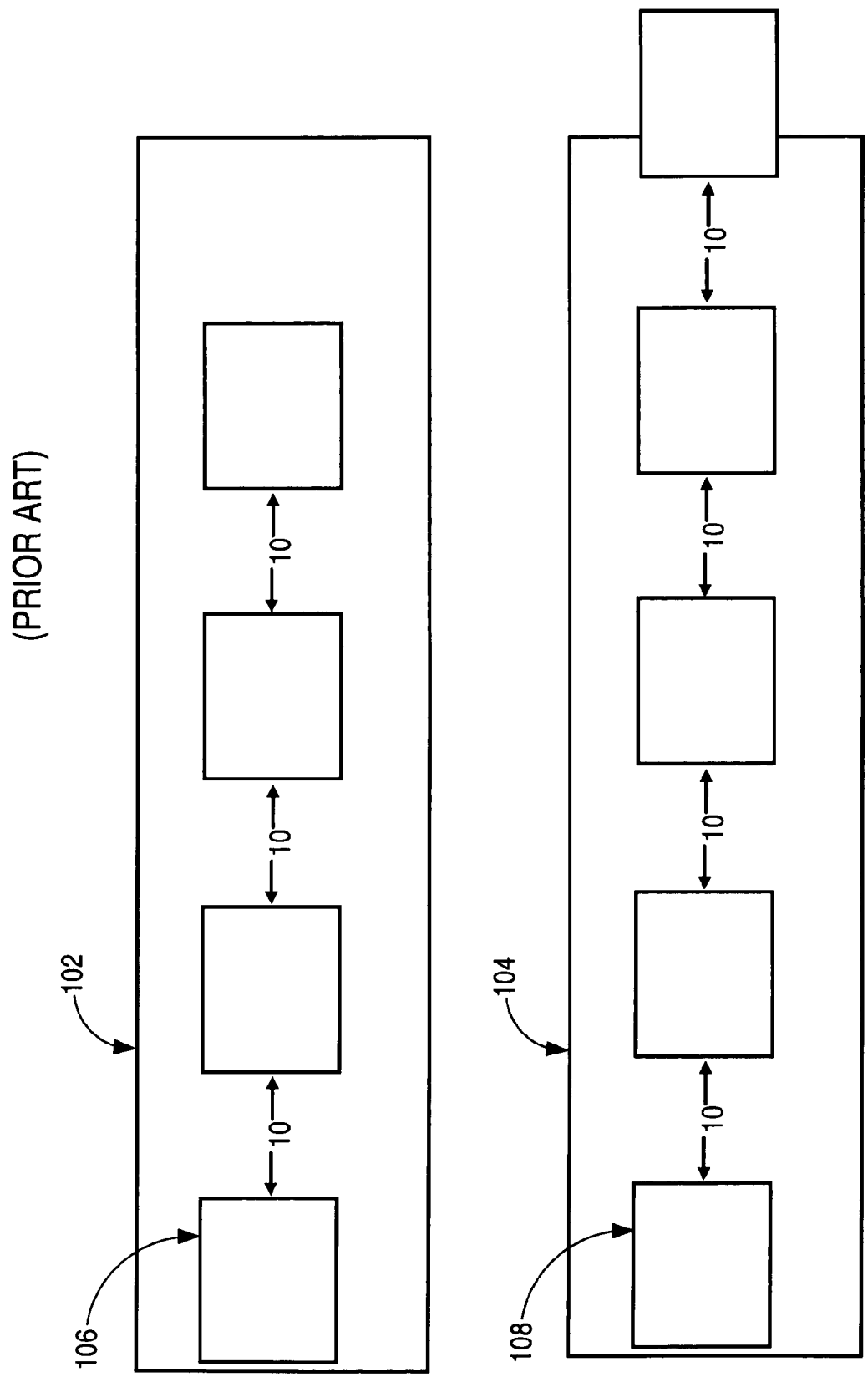
FIG. 1A illustrates the mapping of objects as performed by the prior art.
Figure 1B:
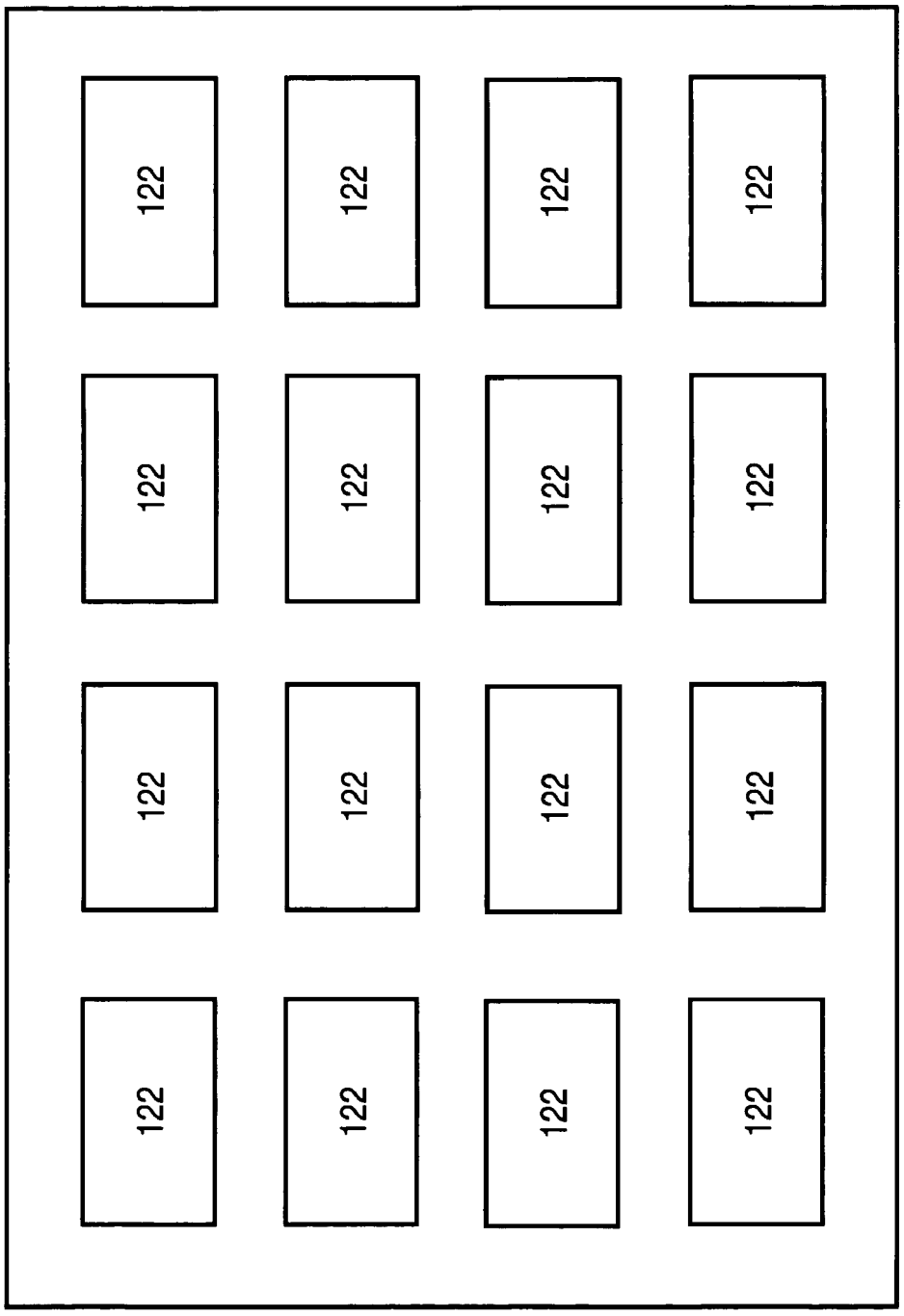
FIG. 1B illustrates the spacing of objects in a multi-dimensional area as performed by the prior art.
Figure 2:
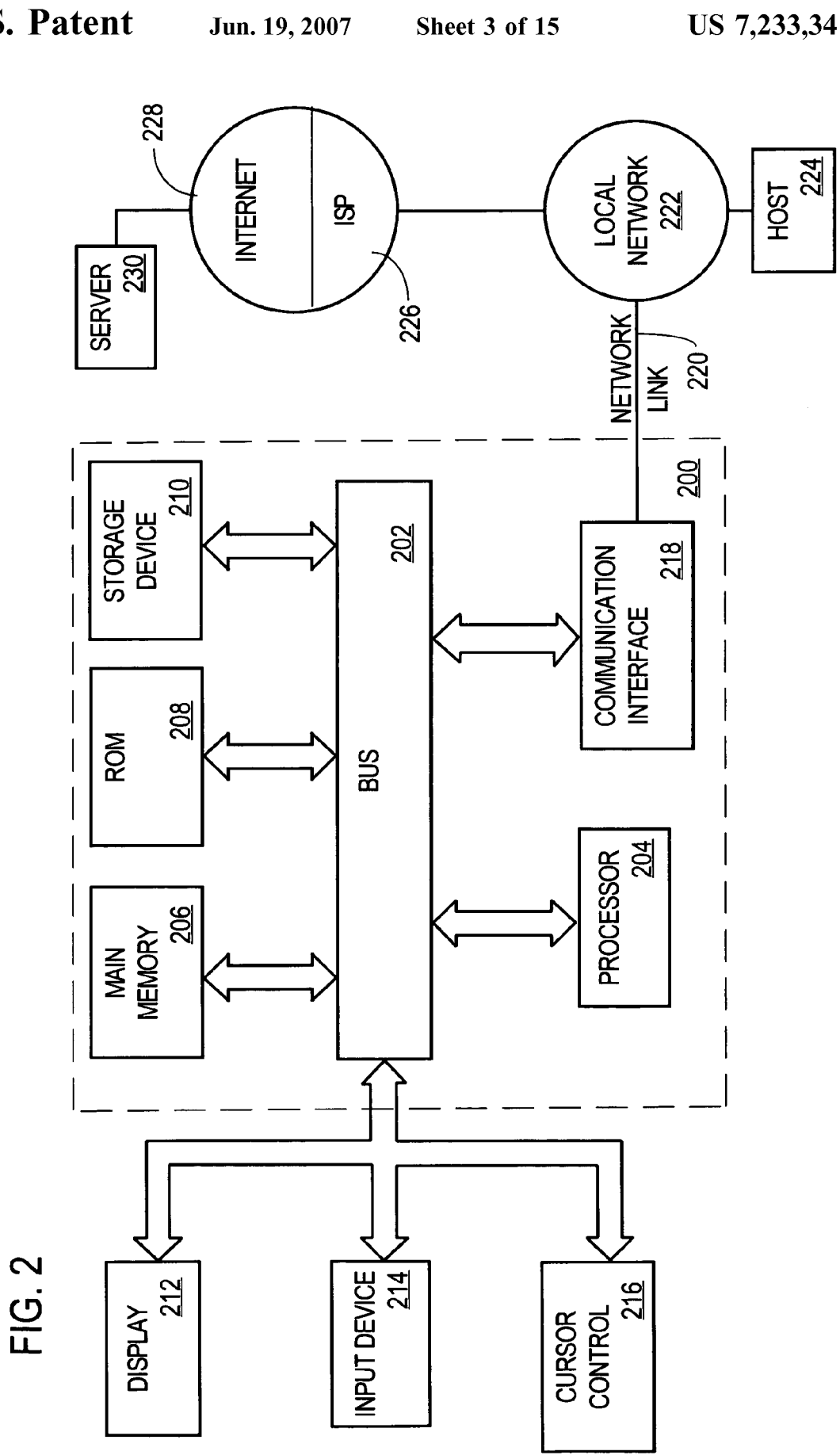
FIG. 2 is a block diagram illustrating a computer system on which an embodiment of the present invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for determining the spacing of objects. According to one embodiment of the invention, the spacing of objects is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any a specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for determining the spacing of objects as described herein.

The received code may be executed by processor 204 as it is received, and/or stored in storage device 210, or other non-volatile storage for later execution. In this manner, computer system 200 may obtain application code in the form of a carrier wave.

Overview

In this context, the term constraint refers to an area, region or space in which objects may be mapped. A constraint may be bounded or unbounded and may be one-dimensional, such as a line segment, or multi-dimensional, such as a sphere or cylinder. For example, the length of a spline indicates bounds of a dimension of the spline. Similarly, both the height and the width of a rectangle independently indicate bounds of a dimension of the rectangle. By the same token, the height, the width and the depth of a cube independently indicate bounds of a dimension of the cube.

When modeled in a computer system, constraints are internally represented by data structures that store attribute values. The attribute values associated with a constraint provide information about the constraint, such as shape and dimensions of the constraint. The dimensions of a constraint may be specified directly or indirectly by the attributes of the constraint. For example, the length of a line segment may be recorded in a single "length" attribute, or (assuming the line is straight) may be derived based upon attributes that indicate the coordinates of the two endpoints of the line segment. Constraints and their corresponding attributes are described in greater detail below.

Techniques are described herein for determining the spacing of objects. In one embodiment, a spacing mechanism receives (1) information that specifies one or more attributes of one or more dimensions of a constraint ("dimension data"), and (2) spacing parameters that indicate spacing requirements for the particular objects ("supplied spacing parameters"). Based on the dimension data and the supplied spacing parameters, the spacing mechanism generates additional spacing parameters ("generated spacing parameters") which, in combination with the supplied spacing parameters, define the spacing of objects.

The dimension data and the supplied spacing parameters may be supplied to the spacing mechanism in a variety of ways. For example, this information may be generated and supplied in response to a user interacting with a display interface, or by causing the spacing mechanism to interface with a set of software instructions or hardware logic.

The "supplied" spacing parameters indicate spacing requirements for objects. For example, a user may interact with a display interface to cause a spacing parameter to be received by the spacing mechanism, where the spacing parameter indicates how far apart objects are to be spaced, or that a particular number of objects are to be mapped onto the constraint.

According to one embodiment, the spacing mechanism uses a grid, in combination with the dimension data and the supplied spacing parameters, for generating the set of "generated" spacing parameters. A grid is an object whose attributes specify spacing parameters. Different types of grids have different types of attributes. In one embodiment, grids are represented as data structures which contain a set of spacing attributes that can be used to generate a set of points that can be used for mapping objects onto a specified constraint. The spacing mechanism allows for mixing and matching of different constraints with different grid types to create different spacing of objects. Examples of different type of grids and how they are used to generate spacing parameters is described in detail below.

In certain embodiments, the spacing mechanism itself maps the generated set of points to the constraint to identify object locations for which objects are to be placed. In other embodiments, the spacing mechanism returns the generated set of points, and/or a set of spacing parameters that can be used to generated the set of points, to a software or hardware module that is responsible for mapping objects onto the specified constraint.

Constraints

Figure 3A:
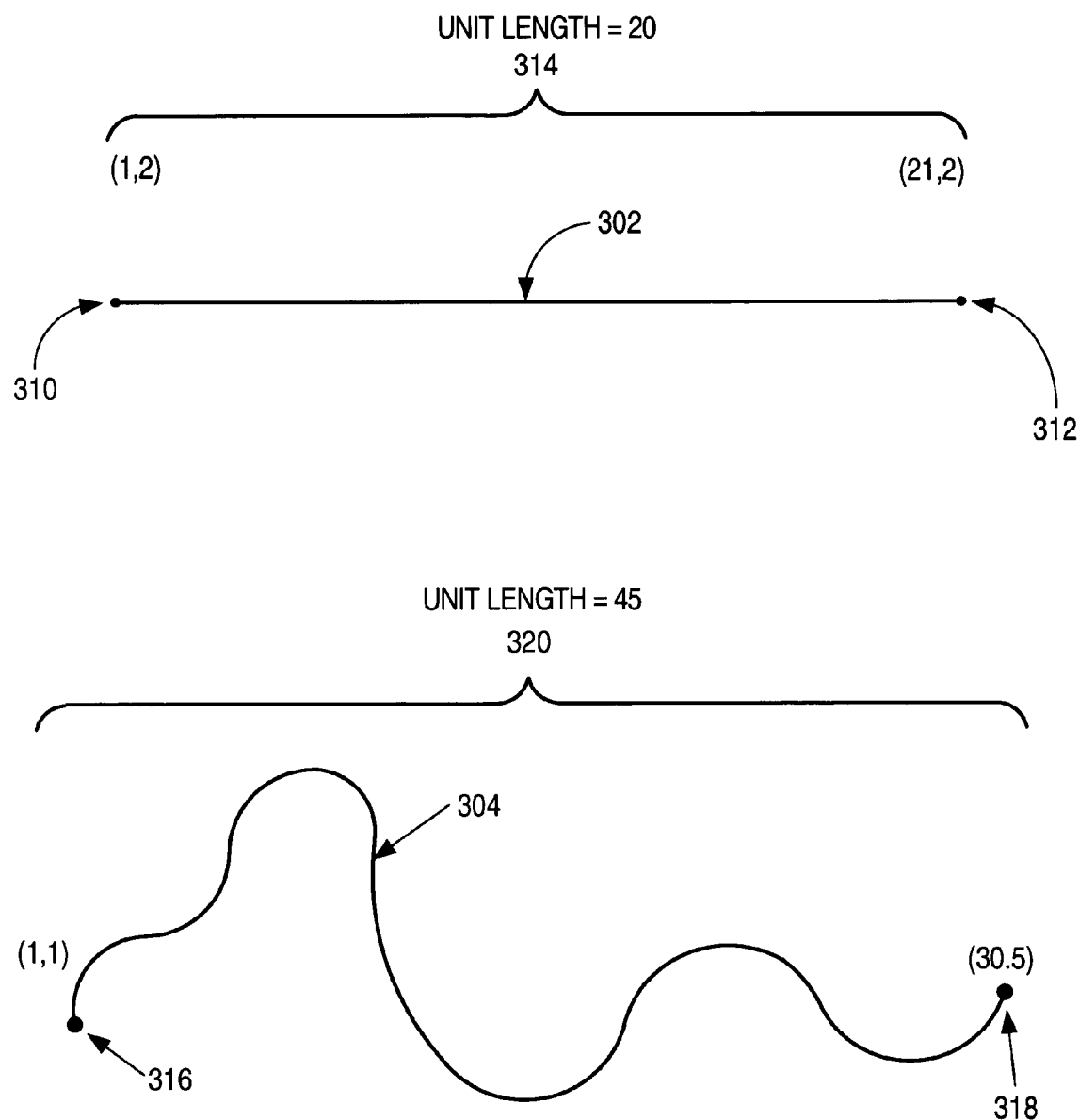
FIG. 3A illustrates an example of some different constraint types for which mapping of objects can be performed.
Figure 3B:
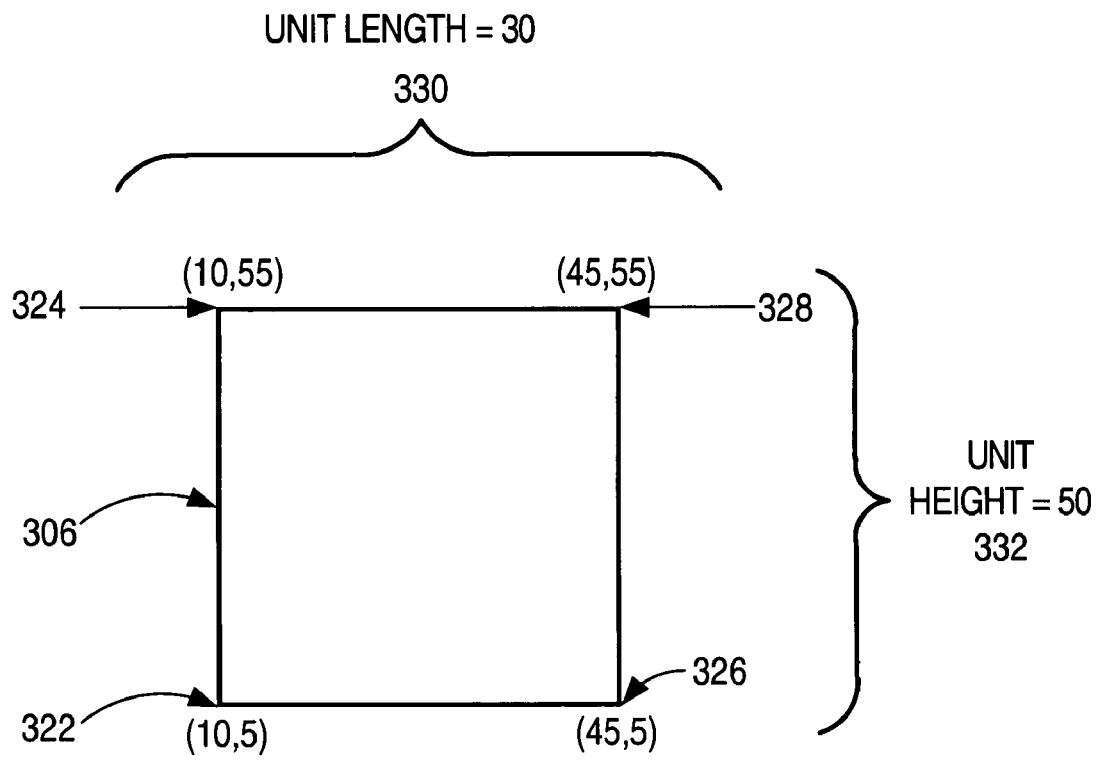
FIG. 3B illustrates additional examples of different constraint types for which mapping of objects can be performed.
Figure 3B:
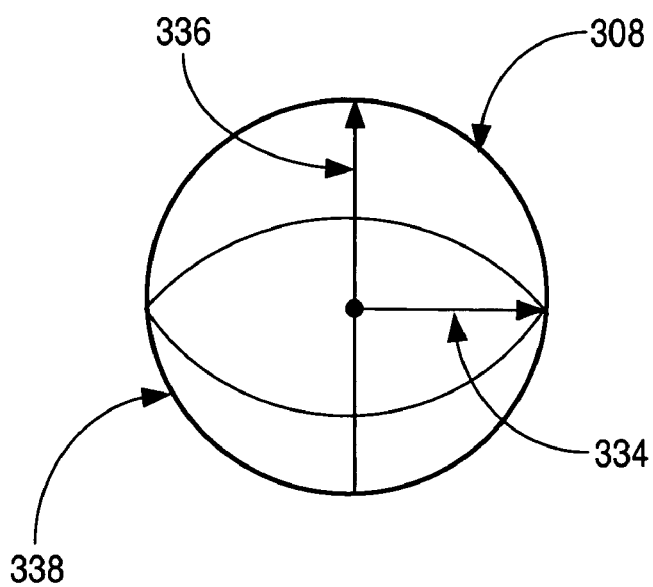

As previously indicated, a constraint may be any line, area, region or space onto which objects may be mapped. The attributes of a constraint define the size and shape of the constraint. FIG. 3 illustrates an example of four constraint types 302, 304, 306 and 308 onto which objects can be mapped. Each constraint is associated with a particular set of attributes. It should be noted that constraint types 302, 304, 306 and 308 are provided for explanation purposes only and that the present invention is not limited to any particular type of constraint.

Constraint 302 is a one-dimensional line segment having a particular set of attributes. As depicted, these attributes include a starting point attribute 310, an ending point attribute 312 and a unit length attribute 314. The unit length attribute 314 indicates a bound on the one-dimension (i.e. length) of constraint 302. Likewise, the combination of the starting point attribute 310 and the ending point attribute 312 also provide a bound on one-dimension of the constraint 302 as they can be used to determine the unit length of constraint 302.

Constraint 304 is also one-dimensional constraint having a plurality of attributes. However, constraint 304 is a spline or path having a starting point attribute 316, an ending point attribute 318, and a unit length attribute 320. The unit length attribute 320 indicates a bound on the one-dimension (i.e. length) of constraint 304.

Constraint 306 is a two-dimensional rectangle having a first corner attribute 322, a second corner attribute 324, a third corner attribute 326, and a fourth corner attribute 328. Constraint 306 also includes a unit length attribute 330 and a unit height attribute 332. In this example, the unit length attribute 330 and the unit height attribute 332 indicate the bounds of the two dimensions of constraint 306. Likewise, the bounds of the two dimensions of constraint 306 are derivable from combinations of the first corner attribute 322, the second corner attribute 324, the third corner attribute 326, and the fourth corner attribute 328.

Constraint 308 is a three-dimensional sphere also having a plurality of attributes that include a radius attribute 334, a diameter attribute 336, a circumference attribute 338 and a volume attribute 340. Knowing that constraint 308 is a sphere, the dimensional bounds of constraint 308 may be derived from any one of the radius attribute 334, the diameter attribute 336, the circumference attribute 338 and the volume attribute 340.

Attributes for one or more dimensions of a particular constraint may be provided to a spacing mechanism using a variety of methods. For example, to provide the length dimension for a line segment, a user may use a pointer device, such as a mouse, to draw the line segment across a display interface. The spacing mechanism then reads the dimensions of the line segment and determines a unit length for the constraint. Alternatively, the user may enter a set of points (i.e. (1,2) and (21,2)) which are then used by the spacing mechanism to determine the unit length of the constraint.

Spacing Parameters

Figure 4A:
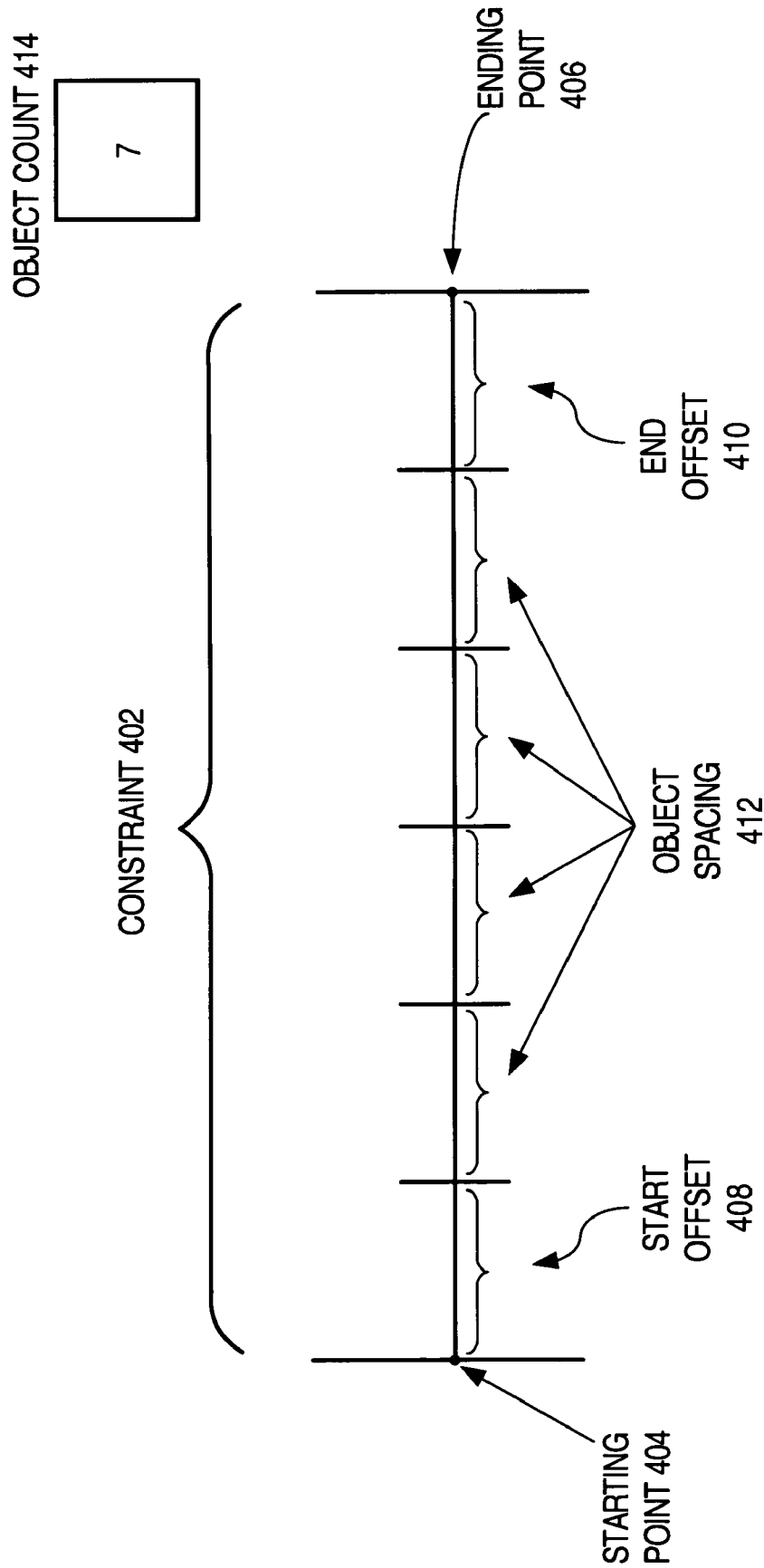
FIG. 4A illustrates an example of spacing parameters that can be received by the spacing mechanism according to an embodiment of the invention.

In addition to dimension data, supplied spacing parameter values are provided to the spacing mechanism. In one embodiment, the user interacts with a display interface to input a particular set of supplied spacing parameter values. The spacing parameter values are used in determining the spacing of the objects. FIG. 4A illustrates an example of some spacing parameters that can be received by the spacing mechanism. As depicted, FIG. 4A contains a constraint 402 that is a line segment. Constraint 402 has a starting point attribute 404 and an ending point attribute 406.

For the purpose of explanation, it shall be assumed that user desires to place a particular type of object (such as a tree) at spaced locations along constraint 402. The spacing parameters that may be used to perform such a spacing operation include a start offset 408, an end offset 410, an object spacing 412 and an object count 414.

The start offset parameter 408 indicates a distance from a starting boundary. Object placement is to begin at this distance from the starting boundary and to extend away from the starting boundary. In the case of a line segment, the starting boundary is the single point indicated by point attribute 404. In the case of a two-dimensional or three-dimensional constraint, the starting boundary may respectively be a line or plane. The start offset parameter 408 may be set to zero to cause the first object to be placed at the starting point 404.

The end offset parameter 410 indicates a distance from an ending boundary.

Object placement is to end at this distance from the ending boundary. In the case of a line segment, the ending boundary is the single point indicated by point attribute 406. In the case of a two-dimensional or three-dimensional constraint, the ending boundary may respectively be a line or plane. The end offset parameter 410 may be set to zero to cause an object to be placed at the ending point 406.

The object spacing parameter 412 indicates the distance that must be maintained between adjacently spaced objects.

The object count parameter 414 indicates the number of objects that are to be mapped to the constraint 402.

According to embodiments of the invention, the user does not supply all of the spacing parameters that associated with spacing objects on a constraint. Rather, the spacing mechanism generates one or more spacing parameters based on a subset of spacing parameters that are supplied to the spacing mechanism.

In certain embodiments, the display interface includes a set of predefined spacing options that can be used to specify which spacing parameters are to be supplied to the spacing mechanism, and to receive input for those spacing parameters. The user interacts with the display interface to select a predefined spacing option. Thereafter, based on the predefined spacing option that was selected, the user enters a set of corresponding spacing parameter values.

Figure 4B:
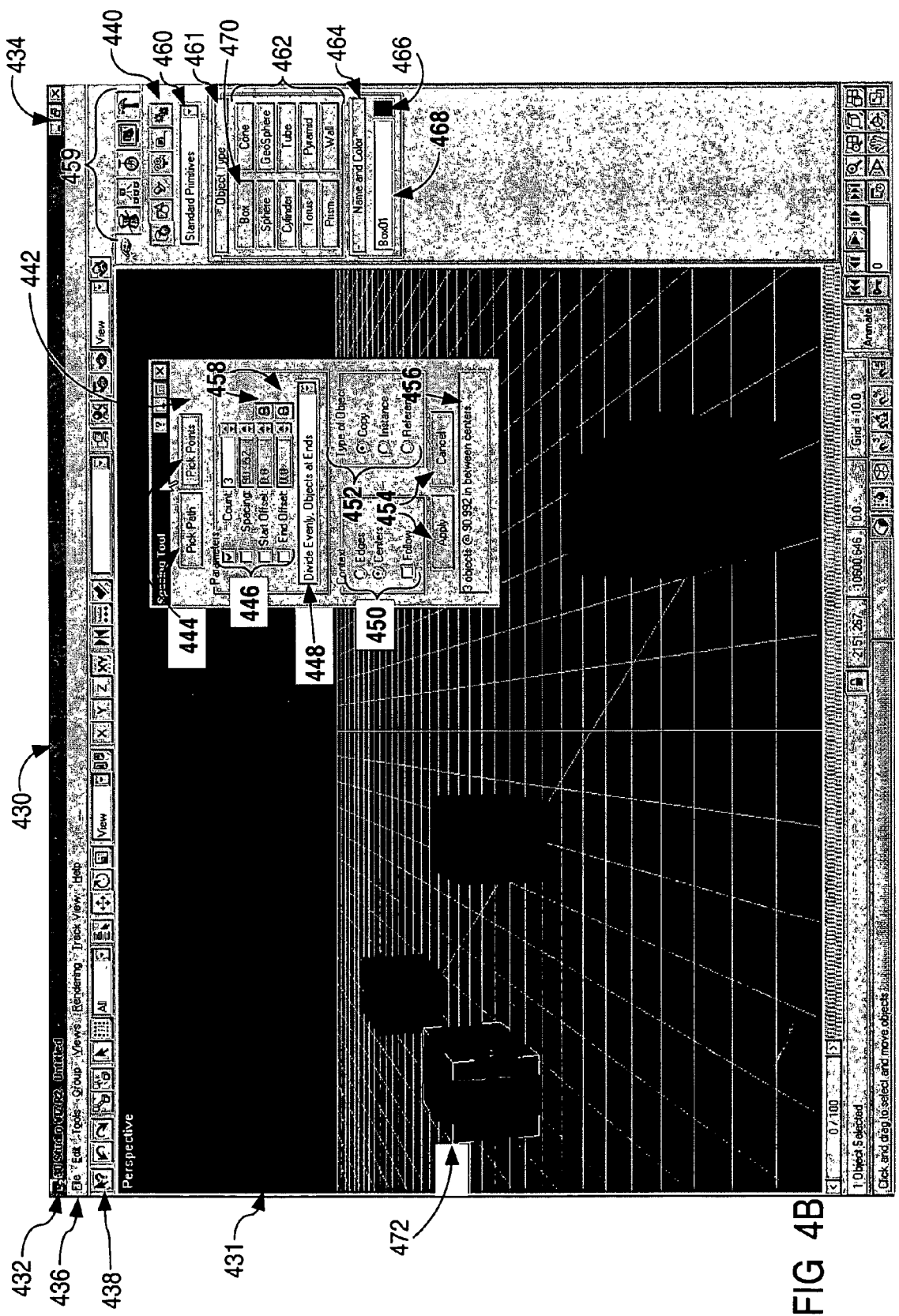
FIG. 4B is a diagram of a user interface display that allows spacing input values to be received by the spacing mechanism.

FIG. 4B is a diagram of a user interface window 430. The window 430 includes certain standard window elements such as a title bar 432 that displays the title of the spacing mechanism, and a set of buttons 434 that enable the user to minimize, maximize, or close the window 430.

A pull-down menu bar 436 is located immediately below the title bar 432. The pull-down menu bar 436 includes function keywords such as File, Edit, Tools, Group, Views, Rendering, Track View and Help that enable the user to manipulate objects. A function button bar 438 is located immediately below the pull-down menu bar 436. The function button bar 438 has buttons that provide rapid access to design tool program known as "3D Studio VIZ", produced by KINETIX™, a Division of Autodesk, Inc. Each of the buttons has a pictorial representation of its function. To activate a particular function, a user can select a button corresponding to the function, for example, by clicking on the button using a pointing device such as a mouse. It should be noted that although this example illustrates the spacing mechanism interfacing with the design tool program "3D Studio VIZ", the spacing of objects as described herein is not limited to any particular object design tool program. Thus, the spacing mechanism can be used to perform the spacing of objects that are generated using a variety of object design tools.

The window 430 also includes a viewing pane 431, a constraint/spacing definition dialog box 442 and an object definition pane 440. The viewing pane 431 provides a viewing area for visually depicting the spacing of objects within a constraint, where the spacing of the objects is generated by the spacing mechanism based on user supplied parameter values.

The constraint/spacing definition dialog box 442 contains constraint buttons 444, supplied parameter buttons 446, spacing option list box 448, object context buttons 450, 110 object parameter buttons 452, user control buttons 454 and an information window 456.

Constraint buttons 444 allow users to define or select a particular constraint upon or within which objects are to be placed (the "target constraint"). For example, in one embodiment, by selecting the "pick path" constraint button, the user can designate a particular spline that is contained in the viewing pane 431 as the target constraint. By selecting "pick points" constraint button, the user can interface with a pointing device, such as a mouse, to define a path in the viewing pane 431. For example, a user can define a path by clicking on multiple locations (points) within the viewing pane 431. The spacing mechanism automatically connects the points to generate a path that is used as the target constraint.

It should be noted that, although this example depicts a set of constraint buttons 444 that allow paths and splines to be selected as the target constraint, the present invention is not limited to any particular type of target constraint. For example, in certain embodiments, constraint buttons may be provided for selecting such types as circle, rectangle, sphere, cylinder, cube, etc.

The supplied parameter buttons 446 provide an interface that allows users to enter a set of supplied spacing parameters. In one embodiment, a user selects a checkbox to indicate that the user will supply the value for the spacing parameter associated with the checkbox. In the illustrated example, the user has selected the checkbox associated with a "count" parameter and has entered a value of "3" to indicate that three objects are to be placed onto the constraint.

The spacing option list box 448 allows the user select from among a set of predefined spacing options that may be used to define the spacing of objects. Several predefined spacing options are described in detail below. The spacing option that is selected using spacing option list box 448 determines which parameters the user may specify using supplied parameter buttons 446. For example, spacing option list box 448 currently indicates that space should be divided evenly, with objects located at the ends. Because the selected option specifies "objects at the ends", the start offset and end offset are set to zero, and are not available for the user to modify. Similarly, because the selected option specifies "divide evenly", the user is not allowed to specify the spacing (because the user may specify a distance that does not evenly divide the length of the constraint).

Lock buttons 458 are used to cause the start offset parameter 408 and end offset parameter 410 values to be equal ("locked") to the object spacing parameter 412 value. For example, because the option box 448 currently indicates that objects are to be located at the ends of the constraint, the lock buttons 458 are associated with the spacing parameters start offset and end offset to indicate their values are locked.

Figure 5A:
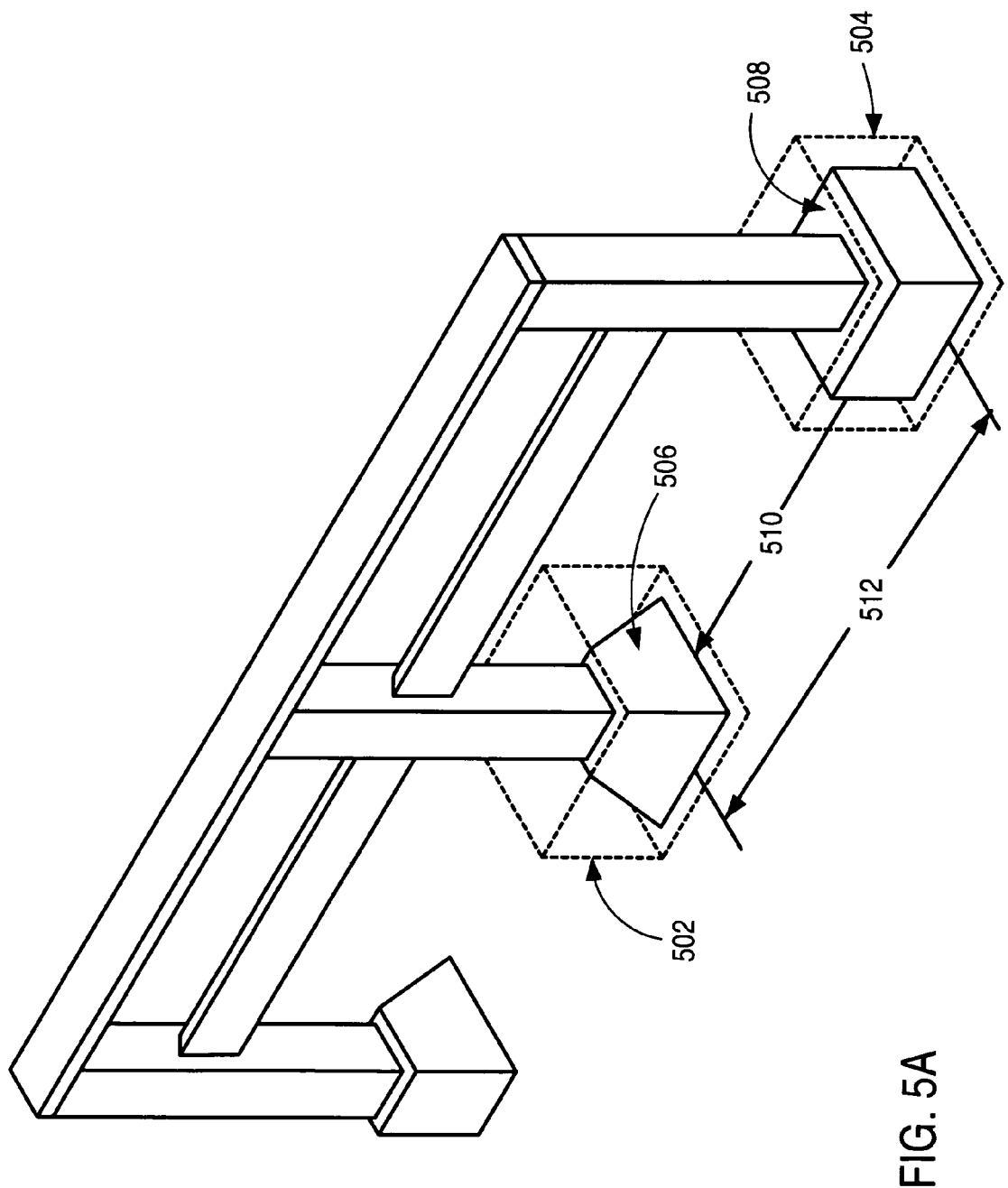
FIG. 5A illustrates the spacing of objects based on their associated bounding boxes.

The object context buttons 450 include spacing and align options. The "edges" and "centers" options allow the user to define whether spacing is to be determined by the center of an object's bounding box or by the edge of the object's bounding box. For example, FIG. 5A illustrates the spacing of piers 506 and 508 based on their associated bounding boxes. Piers 506 and 508 are respectively associated with bounding boxes 502 and 504. The bounding box defines the area and subject matter of a particular object and is described in detail below. In this example, spacing 510 represents the spacing between the edges of bounding box 502 and bounding box 504 which is used when the spacing by edges option is selected. Spacing 512 represents the spacing between the centers of bounding box 502 and bounding box 504 which is used when the spacing by centers option is selected.

Figure 5B:
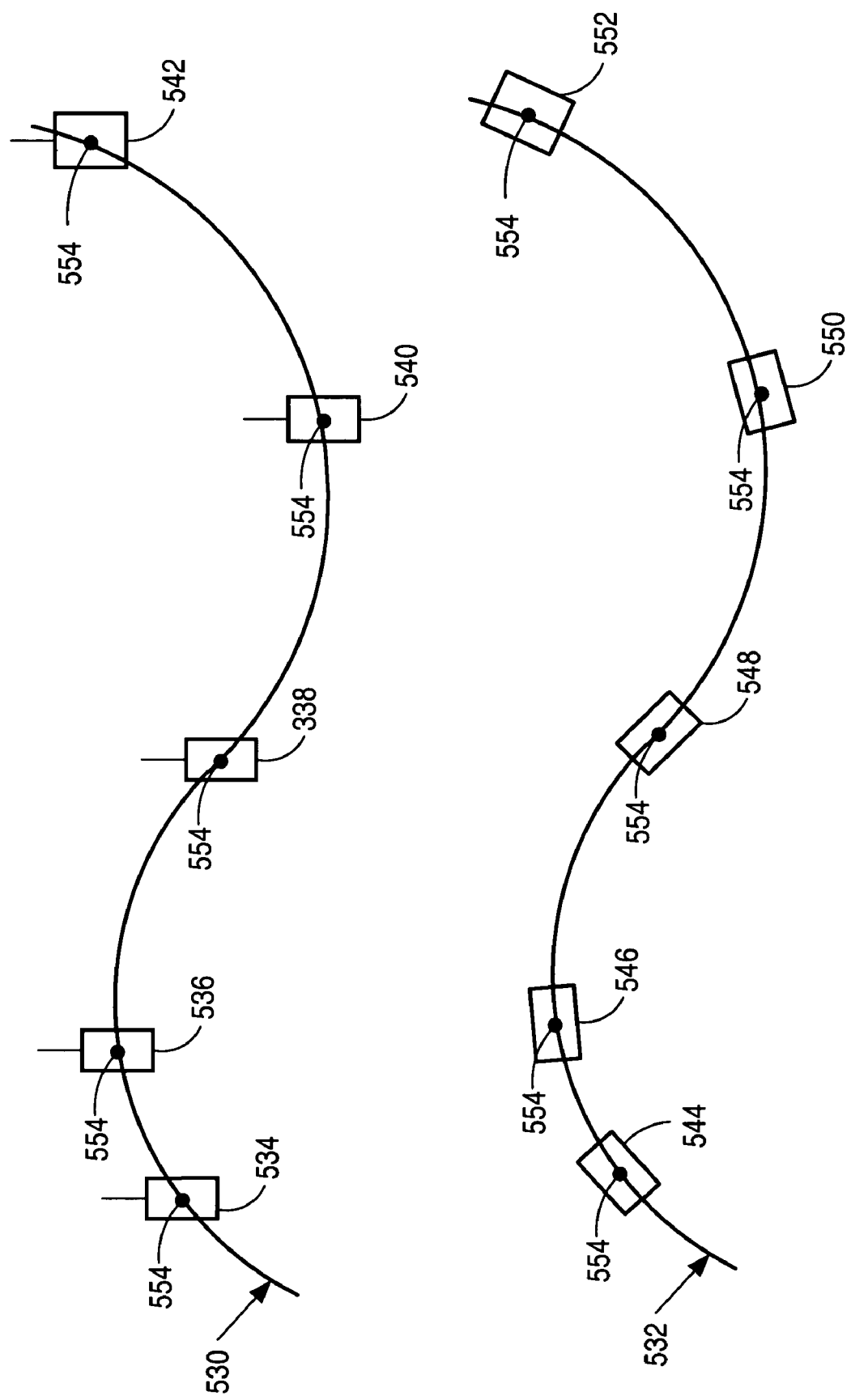
FIG. 5B illustrates how an object's pivot point is used in the orientation of objects on a constraint.

In addition to a bounding box, each object contains a pivot point that is located within its bounding box. The "follow" option can be used to cause the object's pivot point to align with the tangent of a particular constraint. Pivot points are described in detail below. For example, FIG. 5B illustrates how an object's pivot point is used in the orientation of objects on a constraint. As illustrated, splines 530 and 532 are respectively associated with objects 534–542 and 544–552. Each of the objects 534–552 contains a pivot point 554 that is used to define how the object is orientated on the constraint. In this example, the follow option in object context buttons 450 was not selected for spacing the objects 534–542 on spline 530. Thus, the pivot points of objects 534–542 do not align to the tangent of spline 530. Alternatively, the follow option in object content buttons 450 was selected for spacing the objects 544–552 on spline 532. Thus, the pivot points of objects 544–552 do align to the tangent of spline 532.

The object parameter buttons 452 allow users to specify whether the objects that are to be placed on the constraints are copies of instances of, or references to, a particular object. If a copy of the original object is created, it becomes it's own entity which is no longer tied or associated with the original object. Thus, modifying the original object does not effect the copies that were created from it. However, if an instance of the original object is generated, the object instance remains tied or associated with the original object and is therefore influenced by any changes to the original object. In addition, if a modification is made to an object instance, the modification is reflected back to the original object, thus causing the changes to be reflected in all instances of the original object. Conversely, if a reference of an object is generated, the object instance remains tied or associated with the original object and is therefore influenced by any changes to the original object. However, changes to a reference object are not reflected back to the original object and therefore are not reflected in other instances of the original object.

For example, if copies of an original object are created and placed on a constraint and the original object is then modified (i.e. enlarged, rotated, shaded), the copies are not affected by the modifications. However, if instances of an original object are generated and placed on a constraint, and the original object is then modified (i.e. enlarged, rotated, shaded), the same modifications are reflected in the object instances. Likewise, if references of the original object are generated and placed on a constraint, and the original object is then modified (i.e. enlarged, rotated, shaded), the same modifications are reflected in the object references. If a modification is made to one of the object instances, all of the object instances, including the original object, are updated to reflect the modifications. However, if a modification is made to one of the object references, none of the object references, including the original object, are updated to reflect the modifications.

The user control buttons 454 allow a user to either apply the selected parameter values or cancel the selections. The information window 456 provides a type of help window that indicates a particular action that should be perform by the user.

The object definition pane 440 includes object selection buttons 459, object scroll bar 460, object type selection button 461, object type buttons 462, object name/color select button 464, color box 466 and object name box 468.

The object selection buttons 459 provide an interface that allows users to create and manipulate objects. When a user selects one of the object selection buttons 459, an interface is provided that allows the user to specify values for defining or manipulating an object. For example, if the "wall" button of object selection buttons 459 is selected, a dialog box is presented to the user which allows the user to define the width and height of the wall.

The object scroll bar 460 provides a set of predefined options for defining characteristics for a particular predefined object.

The object type selection button 461 causes a set of object type buttons 462 to become active when it is selected. The object type buttons 462 correspond to predefined objects that a user may select for spacing on a particular constraint. For example, selecting the "Box" object type button 470 causes a box object 472 to be created and displayed on viewing pane 431.

The object name/color select button 464 allows a user to enter a predefined object in the object name box 468. The object associated with the predefined name in displayed on viewing pane 431. Color box 466 allows the user to select a particular color for the object entered in object name box 468.

The user interacts with the display interface to select a predefined spacing option. Thereafter, based on the predefined spacing option that was selected, the user enters a set of corresponding spacing parameter values.

Predefined Spacing Options

As previously indicated, a set of predefined spacing options are provided to the user for defining the spacing of objects. For example, in one embodiment, the spacing option list box 448 in the constraint/spacing definition dialog box 442 provides the following spacing options:

(1) Free Center: which causes objects, beginning at the starting point of the path, to be spaced equally along a straight line towards the ending point of the path. For this option, the user is required to supply an object count parameter and an object spacing parameter.

(2) Divide Evenly, Objects at Ends: which distributes objects along a spline. The objects are centered at the middle of the spline. The spacing mechanism evenly fills the spline with the specified number of objects specified and determines the amount of space between objects. For this option, the user is required to supply an object count parameter. If the object count parameter is greater than one, objects are guaranteed to placed at both ends of the spline.

(3) Centered, Specify Spacing: which distributes objects along a path. The group of objects is centered at the middle of the path. The spacing mechanism attempts to evenly fill the path with as many objects as it can fit along the length of the path using the amount of space specified. For this option, the user is required to supply an object spacing parameter. Whether there are objects at the ends of the path depends on the length of the path and the particular spacing that is requested.

(4) End Offset: which distributes the number of specified objects along a straight line. For this option, the user is required to supply an end offset parameter and an object spacing parameter. The objects begin at the specified end offset. The object spacing is measured from the end offset of the spline towards the start of the spline, or from the second of the pair of points towards the first.

(5) End Offset, Divide Evenly: which distributes evenly the number of objects specified between the starting point of a spline or a pair of points and an end offset. Objects placed at either the ending point of the spline or at the end offset. For this option, the user is required to supply an object count parameter an end offset parameter. When more than one object is specified, an object is guaranteed to be placed at the starting point of the spline. The Spacing mechanism attempts to evenly fill the space with the objects between the end offset and the starting pointing point of the spline.

(6) End Offset, Specify Spacing: which distributes objects towards the start of a spline, starting at the end offset or the ending point of the spline. Objects are placed at the end of the spline or its end offset. For this option, the user is required to supply an object spacing parameter an end offset parameter. The Spacing mechanism attempts to evenly fill the space with as many objects as it can fit between the ending point or end offset and the starting point of the spline. Using this option, an object is not guaranteed to be placed at the starting point of the spline.

(7) Start Offset: which distributes the number of objects specified along a straight line. The objects are placed beginning at a start offset. For this option, the user supplies a start offset parameter and an object count parameter. However, the user may instead specify a start offset parameter and an object spacing parameter.

(8) Start Offset, Divide Evenly: which evenly distributes the number of objects specified, beginning at a start offset and continuing to the end of the spline. An object is placed at the start offset. For this option, the user supplies a start offset parameter and an object count parameter. If more than one object is specified, an object is guaranteed to be placed at the ending point of the spline. The Spacing mechanism attempts to evenly fill the space with the objects between the start offset and the ending point.

(9) Start Offset, Specify Spacing: which distributes objects beginning with a start offset and continuing towards the ending point of a spline. Objects are placed beginning at the start offset. For this option, the user supplies a start offset parameter and an object spacing parameter. The Spacing mechanism attempts to evenly fill the space with as many objects as it can fit between the start offset and the ending point of the spline. An object is not guaranteed to be placed at the ending point of the spline.

(10) Specify Offsets and Spacing: which distributes as many equally spaced objects as possible, given a user specified spacing, along a spline or between a pair of points. For this option, the user supplies an object spacing parameter. The user may also specify start offset and end offset parameters. If both start and end offsets are specified, the spacing mechanism distributes objects equally between the offsets. An object is not guaranteed to be placed at the starting or ending point of the spline.

(11) Specify Offsets, Divide Evenly: which distributes the number of objects specified along a spline or between a pair of points. For this option, the user supplies an object count parameter, a start offset and a end offset. If only one object is specified, the spacing mechanism places it at the center of the path. If more than one object is specified, the spacing mechanism places an object at the start offset and the end offset. If more than two objects are specified, the spacing mechanism evenly distributes the objects between the two offsets.

(12) Space from End, Unbounded: which distributes the number of objects specified along a straight line starting from the ending point and continuing towards the starting point of the spline or a pair of points. For this option, the user supplies an object spacing parameter. The spacing mechanism sets the end offset to equal the object spacing parameter.

(13) Space from End, Specify Number: which distributes the number of objects specified starting with the ending point and continuing towards the starting point. The Spacing mechanism determines the amount of space between objects based on the number of objects and the length of the spline or the distance between the pair of points. For this option, the user supplies an object count parameter. The spacing mechanism sets the end offset to equal the object spacing parameter.

(14) Space from End, Specify Spacing: which distributes as many equally spaced objects as possible starting with the ending point and continuing towards the starting point. For this option, the user supplies an object spacing parameter. The spacing mechanism sets the end offset to equal the object spacing parameter.

(15) Space from Start, Unbounded: which distributes the number of objects specified along a straight line starting with the starting point and continuing towards the ending point. For this option, the user supplies an object spacing parameter. The spacing mechanism sets the start offset to equal the object spacing parameter.

(16) Space from Start, Specify Number: which distributes the number of objects specified starting with the starting point and continuing towards the ending point. The Spacing mechanism determines the amount of space between objects based on the number of objects and the length of the spline or the distance between the pair of points. For this option, the user supplies an object count parameter. The spacing mechanism sets the start offset to equal the object spacing parameter.

(17) Space from Start, Specify Spacing: which distributes as many equally spaced objects as possible starting with the starting point and continuing towards the ending point. For this option, the user supplies an object spacing parameter. The spacing mechanism sets the start offset to equal the object spacing parameter.

(18) Divide Evenly, No Objects at Ends: which distributes the number of objects you specified along a spline or between a pair of points (and their offsets). For this option, the user supplies an object count parameter. The Spacing mechanism determines the amount of space between objects. The spacing mechanism sets the start offset and the end offset to equal the object spacing parameter.

Selecting a Grid Type

After receiving a set of supplied parameter values, the spacing mechanism selects a particular type of grid for determining the spacing of objects. In other embodiments, a user or a set of software that interfaces with the spacing mechanism selects the particular type of grid that is used for determining the spacing of objects. The attributes of a grid indicate how objects should be spaced. In one embodiment, the grid is selected from a pool of grid types. The pool of grid types contains a plurality of grid types having different shapes, coordinates and dimensions. For example, the spacing mechanism may select from such grid types as: a rectangular grid; a polar grid; a hex grid; a triangular mesh grid; a spherical grid; a random grid or a scattered grid type, any of which may be only one dimensional or multiple dimensional. The list of grid types is provided only as an example of some of the types of grids that can be used for the spacing of objects. Therefore, the particular grids types that can be used for the spacing of objects should not be seen as limited to only the types of grids that are listed.

In certain embodiments, only a single type of grid is provided for determining the spacing of objects. Thus, by default, the single type of grid is selected for determining the spacing of objects.

For example, in one case the spacing mechanism may select a two dimensional rectangular grid while in another case the spacing mechanism may select a three dimensional cubical or spherical grid. It should be noted that although specific grid type examples have been provided for explanation purposes, the invention is not limited to any particular grid type or grids of any particular number of dimensions.

A grid is a set of points in space. When a grid is mapped to a constraint, the points of the grid indicate where objects are to be placed on or within the constraint. However, for storage purposes, it is more efficient to store data from which the points may be calculated, rather than the coordinates of the points themselves. The data from which the points of a grid can be calculated are referred to as the attributes of the grid. Different types of grids have different types of attributes. For example, in one embodiment, a one-dimensional linear grid contains the following set of grid attributes:

(a) a spacing attribute, which indicates the spacing between points;

(b) a count attribute that indicates the number of points that are to be spaced along a the length of the grid;

(c) a start offset attribute that indicates the distance, from the starting point of the grid, of the first point in the grid;

(d) an end offset attribute that indicates the distance from the end point of the grid of the last point in the grid;

Alternatively, a two-dimensional rectangular grid contains the following set of grid attributes:

(a) an X-spacing attribute, which indicates the spacing between points in the "x" direction;

(b) a Y-spacing attribute, which indicates the spacing between points in the "y" direction;

(c) an X-count attribute that indicates the number of points that are to be spaced in the "x" direction;

(d) a Y-count attribute that indicates the number of points that are to be spaced in the "y" direction;

(e) an X-start offset attribute that indicates the distance, from the starting point of the grid, of the first point in the grid in the "x" direction;

(f) a Y-start offset attribute that indicates the distance, from the starting point of the grid, of the first point in the grid in the "y" direction;

(g) an X-end offset attribute that indicates the distance from the end point of the grid of the last point in the grid in the "x" direction; and (h) a Y-end offset attribute that indicates the distance from the end point of the grid of the last point in the grid in the "y" direction.

Conversely, a three-dimensional spherical grid contains the following set of grid attributes:

(a) an r-spacing attribute, which indicates spacing between points in the radial direction;

(b) a q-spacing attribute, which indicates spacing between points in the q angle direction;

(c) a j-spacing attribute, which indicates spacing between points in the j angle direction;

(d) an r-count attribute that indicates the number of points that are to be spaced in the radial direction;

(e) a q-count attribute that indicates the number of points that are to be spaced in the q angle direction;

(f) a j-count attribute that indicates the number of points that are to be spaced in the j angle direction;

(g) an r-start offset attribute that indicates the distance, from the center of the grid (i.e. the start of the radius), of the first (i.e. interior beginning) point in the grid in the "r" direction;

(h) an r-end offset attribute that indicates the distance, from the exterior of the grid (i.e. the end of the radius), of the last (i.e. exterior boundary) point in the grid in the "r" direction;

(i) a q-start offset attribute that indicates the distance, from the top of the grid, of the first point in the grid in the "q" direction;

(j) a q-end offset attribute that indicates the distance, from the bottom of the grid, of the last point in the grid in the "q" direction;

(k) a j-start offset attribute that indicates the distance, from the start of the circumference of the grid, of the first point in the grid in the "j" direction;

(l) a j-end offset attribute that indicates the distance, from the end of the circumference of the grid, of the last point in the grid in the "j" direction.

In one embodiment, the spacing mechanism selects a particular grid type based on the set of supplied parameters. For example, if a one-dimensional spacing parameter is received, the spacing mechanism selects a grid type that is at least one-dimensional, such as a one-dimensional linear grid or a two-dimensional rectangular grid. Alternatively, if a two-dimensional spacing parameter is received, the spacing mechanism selects a grid type that is at least two-dimensional, such as a two-dimensional rectangular grid or a three dimensional spherical grid.

In an another embodiment, the spacing mechanism chooses the grid type based on the selected target constraint. For example, if the constraint is a path or a spline, a one-dimensional linear grid is selected. If the target constraint is a cube, then a three-dimensional cubical grid is selected.

Still in other embodiments, the spacing mechanism chooses the grid type based on a combination of the set of supplied parameters and the selected target constraint. In still other embodiments, the user or an interfacing unit of software chooses the grid type based on the selected target constraint, or a combination of the set of supplied parameters and the selected target constraint.

Generating Parameter Values

Once the particular type of grid is selected, the spacing mechanism generates values for each of the grid attributes. Some of the grid attributes values correspond to previously supplied spacing parameter values. In this case, the grid attribute is set equal to the corresponding supplied spacing parameter value. For example, if one of the supplied spacing parameter values includes an object count and a one-dimensional rectangular grid type has been selected, then the count attribute of the one-dimensional rectangular grid is set equal to the supplied object count value.

Figure 5C:
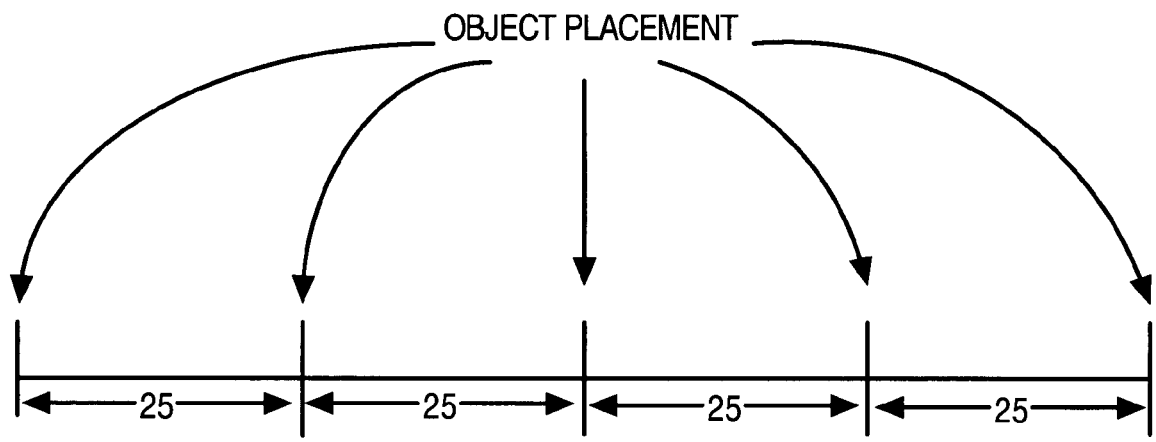
FIG. 5C illustrates the generating of grid attribute values in accordance with an embodiment of the invention.

The grid attributes that do not directly correspond to a supplied spacing parameter are determined based (1) one or more attributes of one or more dimensions of the constraint and (2) the set of supplied spacing parameter values. For example, if the supplied spacing parameters include an object count with a value equal to "5" and the "Divide Evenly, Objects at Ends" spacing option is selected for a constraint having a unit length equal to "100", then as illustrated in FIG. 5C, using a one-dimensional rectangular grid the spacing mechanism generates the following grid attribute values:

(1) a start offset attribute value of "0" units;

(2) an end offset attribute value of "0" units; and (3) a spacing attribute value equal to "25" units.

In this example, the start offset and end offset attributes are effectively "supplied" by the "Objects at Ends" option. The spacing attribute is derived by the spacing mechanism based on the "Divide Evenly" option and the unit length attribute of the target constraint.

Mapping Points to the Constraint

Figure 6:
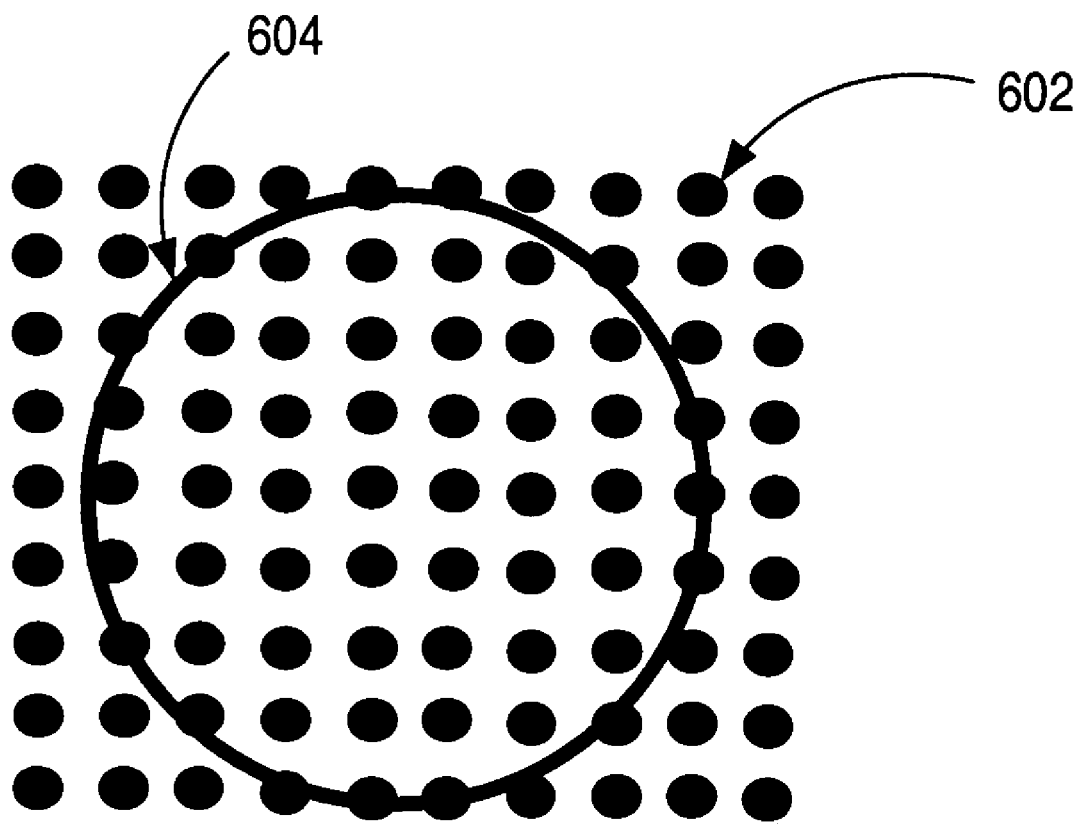
FIG. 6 illustrates the use of a two-dimensional rectangular grid for generating a set of points for mapping objects to a constraint in accordance with an embodiment of the invention.

Once the grid attributes are generated, the spacing mechanism determines how the set of points within the grid map to "real-world" coordinates on or within the target constraint. It is at these coordinates that objects are placed. Because a constraint specifies a real-world area in which objects are to be placed, the set of points that are generated from the grid attributes need to be translated to the particular coordinates of the constraint. In one embodiment, the spacing mechanism compares the generated points with the constraint attributes to determine whether a particular point falls within the constraint boundary. For example, FIG. 6 illustrates the use of a two-dimensional rectangular grid 602 for spacing objects on a target constraint 604. The grid 602 represents a set of points that are mapped to real-world coordinates of the target constraint 604 which are used to determine where objects are to be located on (or in) the target constraint 604. To determine the spacing of objects, the set of points of grid 602 are mapped to the target constraint 604. Once the set of points are mapped, the points that fall within the boundary of the target constraint 604 are identified. These identified points represent "object locations" that indicate where objects are to be placed on (or in) the target constraint 604. Several methods for determining whether a particular point falls within the boundary of a constraint are known in the art and can be used. Examples of such methods are the point-in-sphere technique, the point-in-polygon technique and the point-in-box technique.

In one embodiment, if the spacing mechanism determines that a point falls within the constraint, the point is returned to a software or hardware module that is responsible for placing objects onto (or in) the constraint.

In an alternative embodiment, after identifying a point that falls within the boundary of the constraint, the spacing mechanism causes an object to be placed at the particular point.

In yet another embodiment, the spacing mechanism returns the generated grid attributes to a software or hardware module. The software or hardware module is then itself responsible for determining which points fall within the boundary of the constraint.

Bounding Objects

Figure 7A:
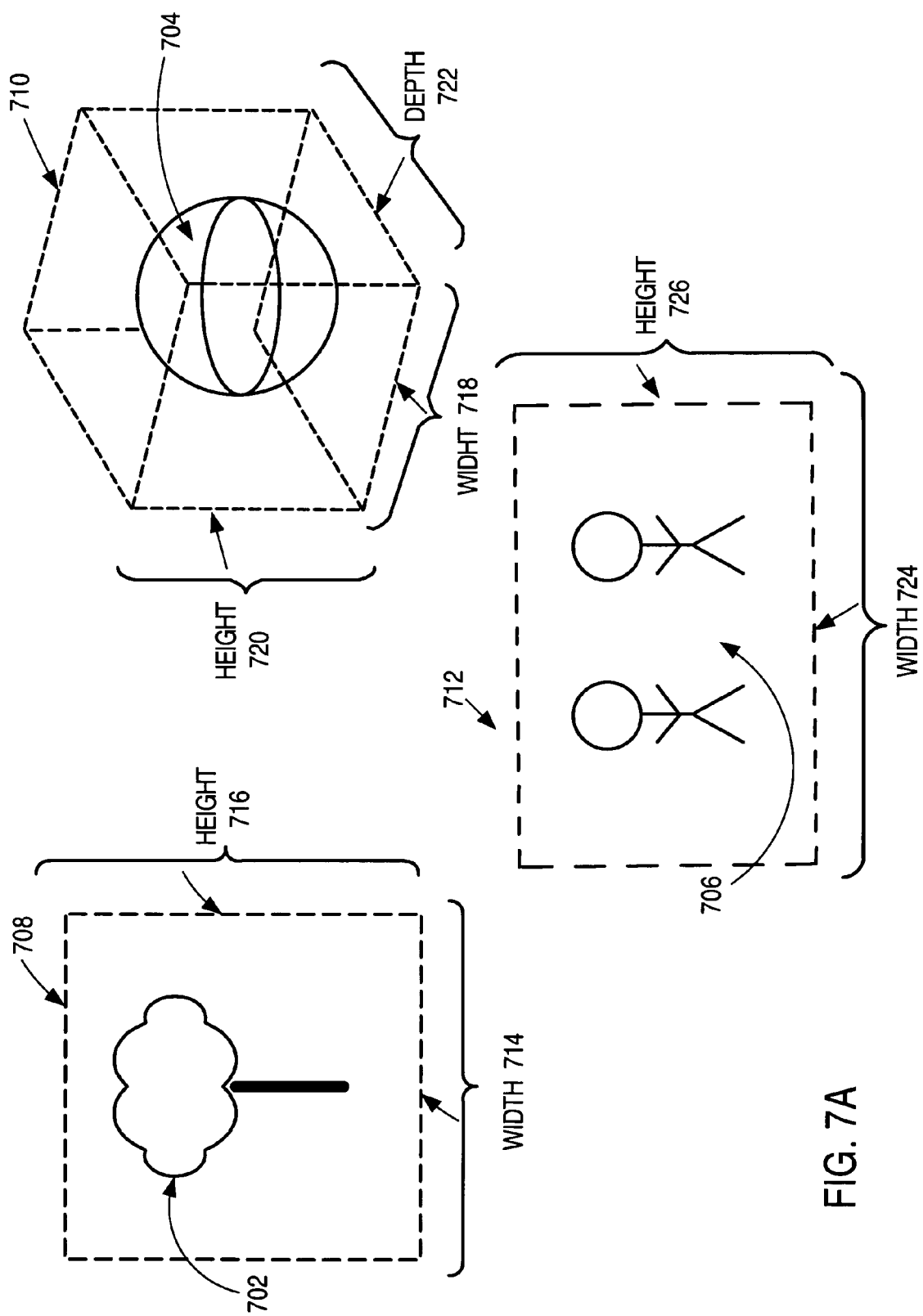
FIG. 7A illustrates an object and its corresponding bounding box.

In certain embodiments, the bounding box of the object is used in determining the spacing of objects. A bounding box defines the area and subject matter of a particular object. FIG. 7A illustrates objects 702, 704 and 706 that are respectively associated with bounding boxes 708, 710 and 712, depicted in dashed lines. Each bounding box has a corresponding set of bounding parameters. In this example, object 702 is bounded by a two-dimensional bounding box 708 having bounding parameters width 714 and height 716. Object 706 is bounded by a two-dimensional bounding box 712 having bounding parameters width 724 and height 726. Alternatively, object 704 is a three-dimensional object that is bounded by a three-dimensional bounding box 710 having bounding parameters width 718, height 720 and depth 722.

Figure 7B:
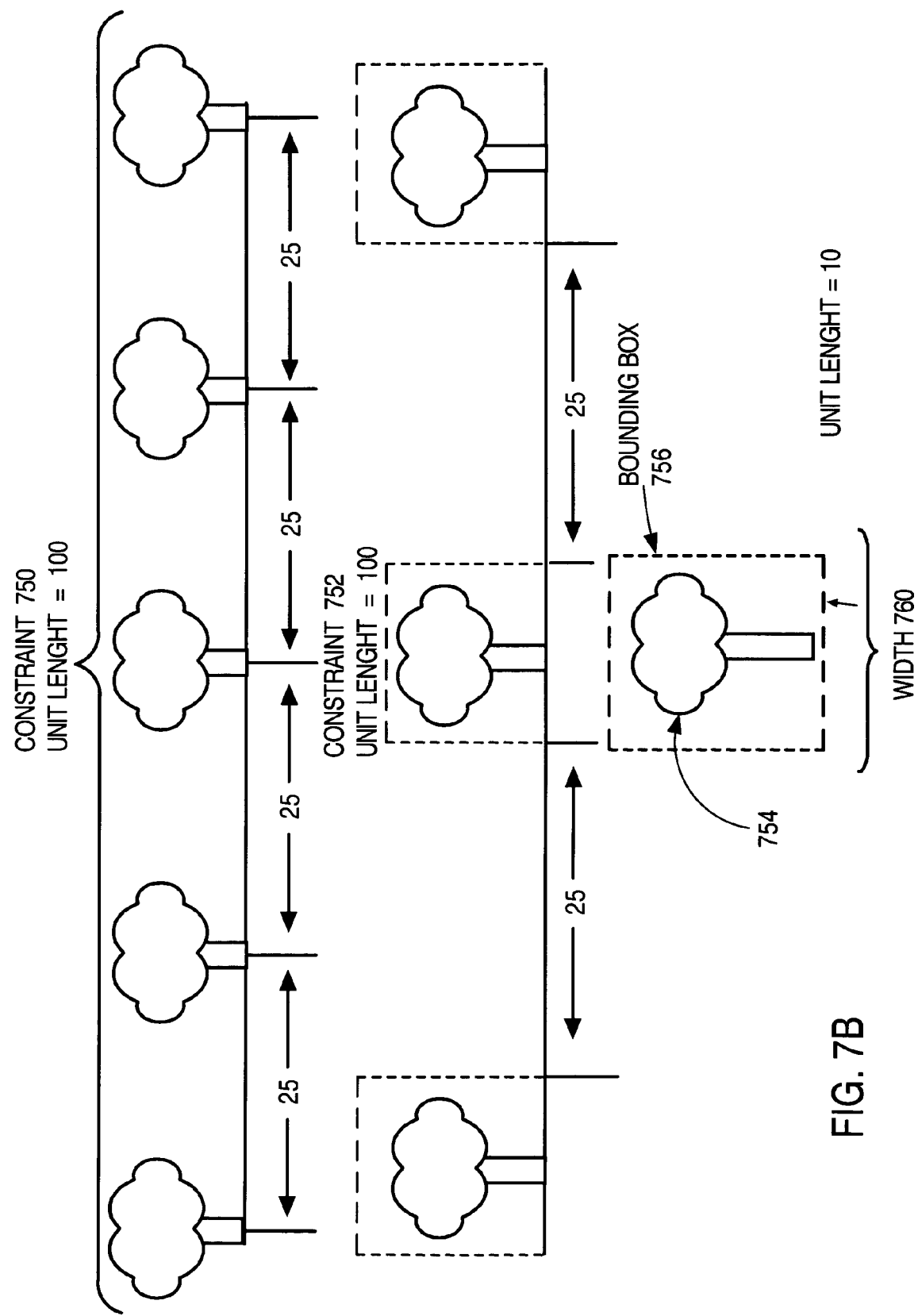
FIG. 7B illustrates the use of an object's bounding box for determining the spacing of objects according to an embodiment of the invention.

In certain embodiments, the spacing mechanism uses the bounding parameters associated with the particular object to determine the spacing of objects. FIG. 7B illustrates the use of an object's bounding box for determining the spacing of objects according to an embodiment of the invention. In this example, constraint 750 and 752 each have a unit length of "100". An object 754 has a bounding box 756 having a width 760 that equals a unit length of "10". It is assumed that the spacing mechanism has received a set of supplied spacing parameters that specify a start and end offsets equal to "0", an object spacing of a unit length equal to "25" and that objects are to be spaced evenly, beginning with the start offset.

If the bounding box 756 of object 754 is not used in determining the spacing of objects, based on the supplied spacing parameters, the spacing mechanism generates a an object count equal to "5" as illustrated by the mapping of objects to constraint 750. However, if the bounding box 756 of object 754 is used in determining the spacing of objects, based on the supplied spacing parameters, the spacing mechanism generates a an object count equal to "3" as illustrated by the mapping of objects to constraint 752.

Figure 7C:
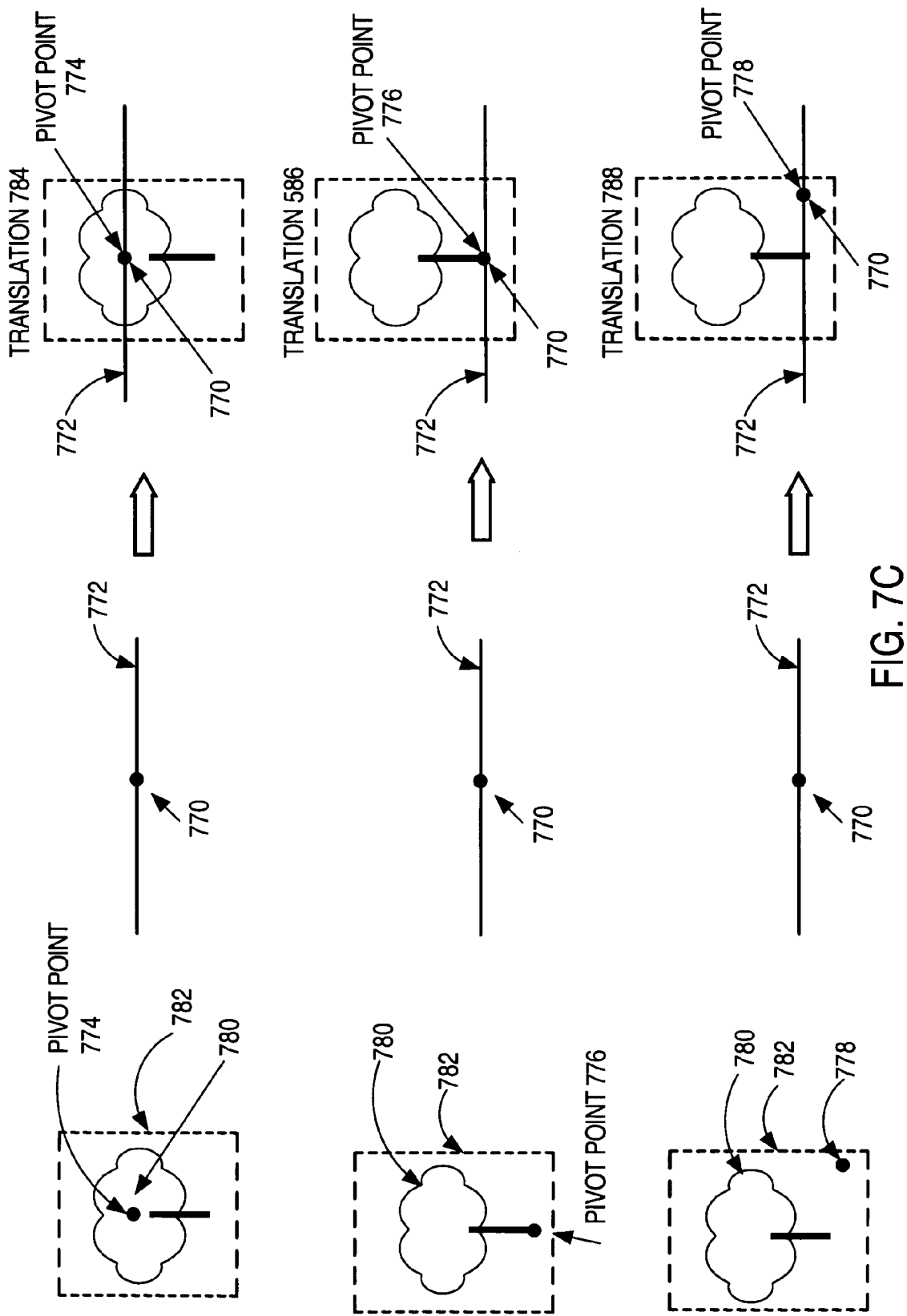
FIG. 7C illustrates the use of a pivot point for placing objects at a points on a constraint.

In certain embodiments, a pivot point is associated with each object that is used to indicate the position of where an object is to be translated relative to a particular point. The pivot point may be located anywhere within the bounding box of the object. FIG. 7C illustrates the use of a pivot point for placing an object at a point 770 on a constraint 772. In this example, multiple copies of point 770 and constraint 772 are shown for explanation purposes. Also depicted are multiple copies of object 780 and it's corresponding bounding box 782. Each bounding box 782 has a corresponding pivot point 774, 776 and 778 that is located at different positions within the copies of bounding box 782. Translations 784, 786 and 788 respectively represent the translation of object 780 to point 770 based on pivot points 774, 776 and 778. As illustrated pivot points 774, 776 and 778 are used in determining the placement of object 780 relative to the point 770 on constraint 772.

Determining the Spacing of Objects

Figure 8:
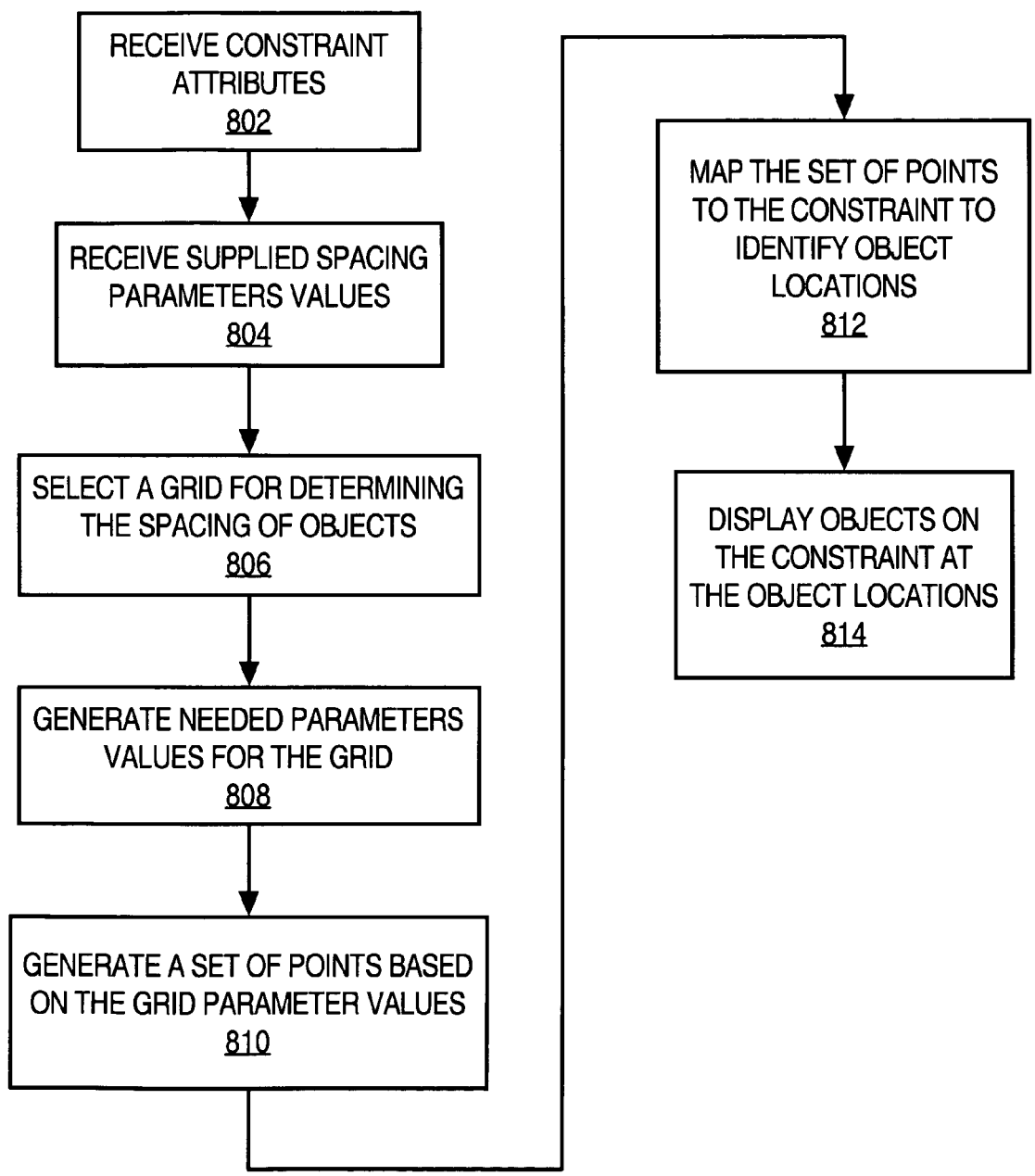
FIG. 8 is a flow diagram illustrating a method for determining the spacing of objects.

FIG. 8 is a flow diagram illustrating a method for determining the spacing of objects.

At step 802, constraint attributes are received that indicate bounds for at least one dimension of the constraint. For example, if the constraint is a spline, the unit length attribute indicates a bound on the length of the spline.

At step 804, a set of supplied spacing parameter values are received that indicate object spacing requirements. For example, the set of supplied spacing parameter values may include an object count value and a start offset value. The object count value indicates the number of objects that are to be mapped in at least one dimension of the constraint and the start offset value indicates a location of where objects are to begin being placed for at least one dimension of the constraint.

At step 806, a grid is selected for determining the spacing of objects. In one embodiment, the grid type is determined based on one or more of the supplied spacing parameters. For example, if the supplied spacing parameters indicate that objects are to be spaced on a two-dimensional constraint, then a grid type that is at least two-dimensional is selected.

At step 808, parameter values are generated for the particular type of grid that was selected. The parameter values are generated based on the supplied spacing parameters and at least one attribute that indicates a bound on at least one dimension of the target constraint. For example, assuming a constraint attribute indicating an unit length of "100", and a set of supplied parameter values indicating an object count equal to "5" and a start and end offset equal to "0", then if a one-dimensional rectangular grid is selected, an object spacing value equal to "25" is generated.

At step 810, a set of points is generated based on the parameter values of the selected grid.

At step 812, the generated set of points is mapped onto the constraint to generate a set of object locations.

At step 814, the constraint is displayed and objects placed onto the constraint at the object locations that were determined in step 812. In other embodiments, the objects are not displayed on the constraint. For example, the generated set of points may be returned to a unit of software that is interfacing with the spacing mechanism.

Although specific details have been provided for explanation purposes, the invention should not be construed as being limited to any particular example or step that has been described.

For example, in one embodiment, at step 802 the spacing mechanism may also receive input describing attributes of the object that are to be placed onto, or within the constraint. The object attributes may contain information that indicates the object's bounding box parameters or the location of where the object can be obtained. At step 808, the object's attributes are used in generating values for the parameters for the selected grid.

In certain embodiments, instead of mapping the generating points onto, or within the constraint itself (step 812), the spacing mechanism returns spacing information to a software or hardware module that is responsible for placing the objects onto or within the constraint.

For example, in one embodiment, after generating the needed parameter values for the grid in step 808, the grid parameter values are returned to a software module that is capable of interfacing with the spacing mechanism. The software module then uses the grid parameter values to determine the spacing of objects itself.

In another embodiment, after generating the set of points at step 810, the set of generated points is returned to a software or hardware module. The software or hardware module then uses the set of generated points to determine the spacing of objects itself.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for determining the spacing of objects, the method comprising the steps of:
   receiving dimension data that defines a constraint;
   receiving a set of supplied spacing parameter values that indicate how to space objects relative to said constraint;
   selecting a grid type from a plurality of grid types, wherein the grid type is associated with a set of grid parameters;
   generating grid parameter values based on the supplied spacing parameter values and the dimension data, wherein the generated grid parameter values are associated with a subset of the set of grid parameters;
   generating a set of points based on the generated grid parameter values and the supplied spacing parameter values;
   mapping the set of points to the defined constraint to establish locations of the objects relative to said constraint; and
   displaying the objects on said constraint at the established locations for the objects.

2. The method of claim 1, wherein the step of selecting a grid type includes the step of selecting the grid type based on the set of supplied spacing parameter values.

3. The method of claim 1, wherein the step of selecting a grid type includes the step of selecting the grid type based on the defined constraint.

4. The method of claim 1, wherein the step of selecting a grid type includes the step of selecting the grid type based on user input that specifies a particular type of grid that is to be used.

5. The method of claim 1, wherein the step of selecting a grid type includes the step of selecting the grid type based on the set of supplied spacing parameter values and the defined constraint.

6. The method of claim 1, further comprising the step of receiving input that specifies one or more attributes of said constraint, wherein said one or more attributes are associated with one or more bounds of one or more dimensions of said constraint.

7. The method of claim 1, wherein the step of receiving dimension data that defines a constraint includes the step of receiving data that defines a one-dimensional constraint.

8. The method of claim 1, wherein the step of receiving dimension data that defines a constraint includes the step of receiving data that defines a multi-dimensional constraint.

9. The method of claim 1, wherein the step of receiving dimension data that defines a constraint includes the step of receiving data that defines a spline constraint.

10. The method of claim 1, wherein the step of receiving dimension data that defines a constraint includes the step of receiving data that defines a sphere constraint.

11. The method of claim 1, wherein the step of receiving dimension data that defines a constraint includes the step of receiving data that defines a cylinder constraint.

12. The method of claim 1, wherein the step of receiving dimension data that defines a constraint includes the step of receiving data that defines a rectangle constraint.

13. The method of claim 1, wherein the step of receiving dimension data that defines a constraint includes the step of receiving data that defines a line segment constraint.

14. The method of claim 1, wherein the step of selecting a grid type includes the step of selecting a two-dimensional grid type.

15. The method of claim 1, wherein the step of selecting a grid type includes the step of selecting a three-dimensional grid type.

16. The method of claim 1, wherein the stop of selecting a grid type includes the step of selecting a rectangular grid type.

17. The method of claim 1, wherein the step of selecting a grid type includes the step of selecting a polar grid type.

18. The method of claim 1, wherein the step of selecting a grid type includes the step of selecting a hex grid type.

19. The method of claim 1, wherein the step of selecting a grid type includes the step of selecting a triangular mesh grid type.

20. The method of claim 1, wherein the step of selecting a grid type includes the step of selecting a spherical grid type.

21. The method of claim 1, wherein the step of selecting a grid type includes the step of selecting a random grid type.

22. The method of claim 1, wherein the step of selecting a grid type includes the step of selecting a scattered grid type.

23. The method of claim 1, further comprising the step of receiving a set of object information, wherein the set of object information identifies a particular object to be placed on the constraint at locations based on said generated set of points.

24. The method of claim 23, wherein the step of generating the set of grid points includes the steps of generating the set of grid points based on the set of object information.

25. The method of claim 24, wherein:
   the set of object information identifies a bounding box that is associated with the particular object; and
   the step of generating the set of grid points based on the set of object information comprises the step of generating the set of grid points based on the bounding box.

26. The method of claim 1, wherein the step of mapping the set of points to the defined constraint includes the step of determining one or more locations to place objects on said constraint by identifying one or more areas of said grid that intersect said constraint.

27. The method of claim 26, further comprising the step of:
   receiving pivot point information, wherein the pivot point information specifies pivot points for the placement of objects relative to the generated set of points; and
   placing objects on said constraint such that the pivot points of said objects coincide with said one or more locations.

28. The method of claim 26, further comprises the steps of:
   identifying a particular object;
   generating a copy of said particular object; and
   placing the copy of said particular object at one or more of said one or more locations.

29. The method of claim 26, further comprises the steps of:
   identifying a particular object;
   generating an instance of said particular object; and
   placing the instance of said particular object at one or more of said one or more locations.

30. A computer-readable storage medium carrying one or more sequences of instructions for determining the spacing of objects, wherein execution of the one or more sequences of instructions by one or more processors causes the one or more processors to perform the steps of:
   receiving dimension data that defines a constraint;
   receiving a set of supplied spacing parameter values that indicate how to space objects relative to said constraint;

selecting a grid type from a plurality of grid types, wherein the grid type is associated with a set of grid parameters;

generating grid parameter values based on the supplied spacing parameter values and the dimension data, wherein the generated grid parameter values are associated with a subset of the set of grid parameters;

generating a set of points based on the generated grid parameter values and the supplied spacing parameter values;

mapping the set of points to the defined constraint to establish locations of the objects relative to said constraint; and displaying the objects on said constraint at the established locations for the objects.

31. The computer-readable storage medium of claim 30, wherein the step of selecting a grid type includes the step of selecting the grid type based on the set of supplied spacing parameter values.

32. The computer-readable storage medium of claim 30, wherein the step of selecting a grid type includes the step of selecting the grid type based on the defined constraint.

33. The computer-readable storage medium of claim 30, wherein the step of selecting a grid type includes the step of selecting the grid type based on user input that specifies a particular type of grid that is to be used.

34. The computer-readable storage medium of claim 30, wherein the step of selecting a grid type includes the step of selecting the grid type based on the set of supplied spacing parameter values and the defined constraint.

35. The computer-readable medium storage of claim 30, further comprising instructions for performing the step of receiving input that specifies one or more attributes of said constraint, wherein said one or more attributes are associated with one or more bounds of one or more dimensions of said constraint.

36. The computer-readable storage medium of claim 30, wherein the step of receiving dimension data that defines a constraint includes the step of receiving data that defines a one-dimensional constraint.

37. The computer-readable storage medium of claim 30, wherein the step of receiving dimension data that defines a constraint includes the step of receiving data that defines a multi-dimensional constraint.

38. The computer-readable storage medium of claim 30, wherein the step of selecting a grid type includes the step of selecting a two-dimensional grid type.

39. The computer-readable storage medium of claim 30, wherein the step of selecting a grid type includes the step of selecting a three-dimensional grid type.

40. The computer-readable storage medium of claim 30, wherein the step of selecting a grid type includes the step of selecting a rectangular grid type.

41. The computer-readable storage medium of claim 30, wherein the step of selecting a grid type includes the step of selecting a polar grid type.

42. The computer-readable storage medium of claim 30, wherein the step of selecting a grid type includes the step of selecting a triangular mesh grid type.

43. The computer-readable storage medium of claim 30, wherein the step of selecting a grid type includes the step of selecting a spherical grid type.

44. The computer-readable storage medium of claim 30, further comprising instructions for performing the step of receiving a set of object information, wherein the set of object information identifies a particular object to be placed on the constraint at locations based on said generated set of points.

45. The computer-readable storage medium of claim 44, wherein the step of generating the set of grid points includes the steps of generating the set of grid points based on the set of object information.

46. The computer-readable storage medium of claim 45, wherein:
the set of object information identifies a bounding box that is associated with the particular object; and
the step of generating the set of grid points based on the set of object information comprises the step of generating the set of grid points based on the bounding box.

47. The computer-readable storage medium of claim 30, wherein the step of mapping the set of points to the defined constraint includes the step of determining one or more locations to place objects on said constraint by identifying one or more areas of said grid that intersect said constraint.

48. The computer-readable storage medium of claim 47, further comprising instructions for performing the step of:
receiving pivot point information, wherein the pivot point information specifies pivot points for the placement of objects relative to the generated set of points; and
placing objects on said constraint such that the pivot points of said objects coincide with said one or more locations.

49. The computer-readable storage medium of claim 47, further comprising instructions for performing the steps of:
identifying a particular object;
generating a copy of said particular object; and
placing the copy of said particular object at one or more of said one or more locations.

50. The computer-readable storage medium of claim 47, further comprising instructions for performing the steps of;
identifying a particular object;
generating an instance of said particular object; and
placing the instance of said particular object at one or more of said one or more locations.

51. A computer system for determining the spacing of objects, the system comprising:
a memory;
one or more processors coupled to the memory; and
a set of computer instructions contained in the memory, the set of computer instruction including computer instructions which when executed by the one or more processors, cause the one or more processors to perform the steps of:
receiving dimension data that defines a constraint;
receiving a set of supplied spacing parameter values that indicate how to space objects relative to said constraint;
selecting a grid type from a plurality of grid types, wherein the grid type is associated with a set of grid parameters;
generating grid parameter values based on the supplied spacing parameter values and the dimension data, wherein the generated grid parameter values are associated with a subset of the set of grid parameters;
generating a set of points based on the generated grid parameter values and the supplied spacing parameter values;
mapping the set of points to the defined constraint to establish locations of the objects relative to said constraint; and
displaying the objects on said constraint at the established locations for the objects.

52. A computer system for determining the spacing of objects, the system comprising:
- means for receiving dimension data that defines a constraint;
- means for receiving a set of supplied spacing parameter values that indicate how to space objects relative to said constraint;
- means for selecting a grid type from a plurality of grid types, wherein the grid type is associated with a set of grid parameters;
- means for generating grid parameter values based on the supplied spacing parameter values and the dimension data, wherein the generated grid parameter values are associated with a subset of the set of grid parameters;
- means for generating a set of points based on the generated grid parameter values and the supplied spacing parameter values;
- means for mapping the set of points to the defined constraint to establish locations of the objects relative to said constraint; and
- means for displaying the objects on said constraint at the established locations for the objects.

* * * * *

UNITED STATES PATENT AND TRADEMARK OFFICE
CERTIFICATE OF CORRECTION

| | | |
|---|---|---|
| PATENT NO. | : 7,233,341 B1 | Page 1 of 1 |
| APPLICATION NO. | : 09/955434 | |
| DATED | : July 19, 2007 | |
| INVENTOR(S) | : Peter Sauerbrei | |

It is certified that error appears in the above-identified patent and that said Letters Patent is hereby corrected as shown below:

In column 20, line 1, please replace "stop", with --step--

Signed and Sealed this

Thirteenth Day of May, 2008

JON W. DUDAS
*Director of the United States Patent and Trademark Office*